(12) United States Patent
Rand et al.

(10) Patent No.: US 10,187,727 B2
(45) Date of Patent: Jan. 22, 2019

(54) CONNECTORS FOR DATA TRANSFER

(71) Applicant: Cirrus Logic International Semiconductor Ltd., Edinburgh (GB)

(72) Inventors: Robert David Rand, Peebles (GB); John Laurence Pennock, Juniper Green (GB)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 15/659,276

(22) Filed: Jul. 25, 2017

(65) Prior Publication Data

US 2018/0027330 A1 Jan. 25, 2018

Related U.S. Application Data

(60) Provisional application No. 62/366,236, filed on Jul. 25, 2016.

(30) Foreign Application Priority Data

Nov. 25, 2016 (GB) .................................. 1620000.8
Nov. 25, 2016 (GB) .................................. 1620003.2

(51) Int. Cl.
*H04R 5/02* (2006.01)
*H04R 5/04* (2006.01)
(Continued)

(52) U.S. Cl.
CPC .............. *H04R 5/04* (2013.01); *G06F 13/387* (2013.01); *H01R 13/66* (2013.01); *H01R 29/00* (2013.01);
(Continued)

(58) Field of Classification Search
CPC ......... H04R 5/04; G06F 13/387; H01R 13/66; H01R 29/00
See application file for complete search history.

(56) References Cited

U.S. PATENT DOCUMENTS 6,691,089 B1  2/2004 Su et al.
2010/0198598 A1  8/2010 Herbig et al.
(Continued)

FOREIGN PATENT DOCUMENTS

CN 204836506 U 12/2015
EP 2590274 A2 5/2013
(Continued)

OTHER PUBLICATIONS

International Search Report and Written Opinion of the International Searching Authority, International Application No. PCT/GB2017/052168, dated Jan. 9, 2018.
(Continued)

*Primary Examiner* — Simon King
(74) *Attorney, Agent, or Firm* — Jackson Walker L.L.P.

(57) ABSTRACT

Embodiments of the present disclosure relate to methods and apparatus for peripheral device discovery, the detection of orientation of a connector having multiple degrees of rotational symmetry, and the provision of appropriate signal paths between a host device and a peripheral device. Some embodiments provide a characteristic impedance within the peripheral device that is coupled between rotationally symmetric contacts of the connector and thus enables detection of the connector orientation. The value of the characteristic impedance may be used in some embodiments to determine the type or model of peripheral device. Some embodiments are concerned with the enablement of appropriate signal paths to a peripheral device having a transducer (e.g. a loudspeaker) coupled only to rotationally symmetric contacts of the connector, such as headphones implemented in a "balanced" configuration.

11 Claims, 12 Drawing Sheets

(51) Int. Cl.
    *G06F 13/38*     (2006.01)
    *H01R 13/66*     (2006.01)
    *H01R 29/00*     (2006.01)
    *H04R 1/10*     (2006.01)

(52) U.S. Cl.
    CPC .......... *H04R 1/1041* (2013.01); *H04R 1/1083* (2013.01); *H04R 2420/01* (2013.01); *H04R 2420/05* (2013.01); *H04R 2420/09* (2013.01)

(56) References Cited

U.S. PATENT DOCUMENTS

| | | | |
|---|---|---|---|
| 2013/0267120 A1 | 10/2013 | Rothkopf et al. | |
| 2013/0325473 A1 | 12/2013 | Larcher et al. | |
| 2014/0141635 A1 | 5/2014 | Saunders et al. | |
| 2014/0195232 A1 | 7/2014 | Kurniawati et al. | |
| 2015/0296296 A1 | 10/2015 | Lu et al. | |
| 2016/0337741 A1* | 11/2016 | Amarilio | G06F 3/162 |
| 2017/0150283 A1* | 5/2017 | Taylor | H04R 29/001 |
| 2017/0235694 A1* | 8/2017 | Lee | G06F 13/364 |
| | | | 710/106 |
| 2017/0293335 A1* | 10/2017 | Dunstan | G06F 1/266 |
| 2017/0366468 A1* | 12/2017 | Shoor | H04L 47/6245 |
| 2018/0027330 A1* | 1/2018 | Rand | G06F 13/387 |

FOREIGN PATENT DOCUMENTS

| | | |
|---|---|---|
| EP | 2860639 A1 | 4/2015 |
| WO | 2013/081704 A1 | 6/2013 |
| WO | 2015/191790 A2 | 12/2015 |
| WO | 2015191790 A2 | 12/2015 |

OTHER PUBLICATIONS

Revision 1.2 USB 3.0 Promoter Group: Universal Serial Bus Type-C Cable and Connector Specification, Mar. 25, 2016, p. 1-221, retrieved from the Internet Oct. 19, 2017, pp. 194-199.

The Combined Search and Examination Report issued by the Intellectual Property Office of the United Kingdom dated May 5, 2017 for GB Application No. GB162000.8.

The Search Report issued by the Intellectual Property Office of the United Kingdom dated May 11, 2017 for GB Application No. GB162003.2.

International Search Report and Written Opinion of the International Searching Authority, International Application No. PCT/GB2017/053629, dated Apr. 13, 2018.

* cited by examiner

CONNECTORS FOR DATA TRANSFER

The field of representative embodiments of this disclosure relates to methods, apparatuses, or implementations concerning or relating to connectors for data transfer between a host device and a peripheral device, and especially to bi-directional transfer of audio data channels, and in particular to transfer via a general- or multi-purpose data connector.

BACKGROUND

Many contemporary electronic devices have the facility to connect with external or peripheral audio devices. For instance, mobile telephones, tablets, laptop computers, mp3 players and the like are examples of electronic devices that are operable with peripheral audio devices such as a headset, for example, that is external to and distinct from the electronic device. A peripheral device such as a headset may typically comprise mono or stereo speakers for audio playback and possibly a microphone for voice communication.

Such external peripheral audio devices are often connected via a mating connector such as a plug and socket arrangement. For instance, many audio peripherals such as headsets have a jack plug such as a 3.5 mm jack plug for connection to a suitable jack socket on the host electronic device. A well-known arrangement for a jack plug and its associated socket is TRRS (Tip-Ring-Ring-Sleeve), which has four contacts for left audio, right audio, microphone, and ground. In one known arrangement, the tip (T) and first ring (R1) are used for left (L) and right (R) audio, for example left and right loudspeakers, with the second ring (R2) and sleeve (S) used for the microphone (M) and ground return (G) respectively. It will be appreciated that different arrangements for the left and right audio, microphone, and ground contacts are also possible. This provides for transfer of two channels of analogue audio data from the host device to the peripheral and transfer of a single channel of analogue audio data from the peripheral microphone to the host device.

Some peripherals devices such as headsets may comprise one or more microphone provided for noise cancellation, which may be distinct from, and thus additional to, any microphone provided for voice communication. For example a headset may include one or more additional microphones for detecting ambient noise so that compensating signals may be added to the playback audio to cancel out the ambient noise.

Typically the noise cancellation is performed in the peripheral itself. Thus the electronics to generate an appropriate cancellation signal may be provided in a headset itself, for instance in a dongle in the cable, wired to the multiple microphones. As power is required for the noise cancellation electronics the housing for the electronics may also need to include a battery, making it relatively bulky and heavy, which can be undesirable for a headset.

To avoid this, it has been proposed for the noise cancellation electronics to be provided in the host device, for instance a telephone handset. However, this would require extra connections via the audio jack to allow transfer of audio data from the noise cancelling microphones to the host device.

Various solutions have been proposed, and a common theme among several of them is the ability for a connector plug to be inserted into a connector socket in two or more different orientations. That is, the plug has at least two-fold rotational symmetry. See, for example, the Lightning™ connector produced by Apple Inc., or the USB type-C connector. For ease of use, it is important that the connection is operable in either orientation. A straightforward implementation of this idea is for each signal path in the peripheral device to be connected to multiple pins at rotationally symmetrical positions in the connector plug. Similarly, in the host device, signal paths may be coupled to multiple rotationally symmetrical pins in the connector socket. Thus, in this implementation, the orientation of the plug within the socket is irrelevant to the host device.

However, in many implementations it can be expected that more independent signal paths between the host device and the peripheral device will be needed (as discussed above) than can be handled by simply providing multiple pins for each signal path. Thus circuitry may be required to detect the orientation of the plug within the socket so that signals can be routed appropriately.

Further, there is a wide range of peripheral devices that may connect to the host device, each with different components and connection requirements. In some peripheral devices, for example, similar components may be connected to symmetrical pins of the connector, making it difficult to detect both the type of peripheral device that is connected, and the orientation of the plug within the socket.

SUMMARY

In accordance with an aspect of the invention there is provided a data controller for controlling transfer of data between a host device and a peripheral device via a connector of the host device, the connector comprising a plurality of contacts having n-fold rotational symmetry, wherein n is an integer greater than one. The data controller comprises: a discovery module operable to detect the presence of one or more characteristic impedances on contacts of said connector; and a path controller for enabling signal paths between circuitry of the host device and contacts of said connector, the path controller being operable in at least a first mode and a plurality of second modes to enable signal paths between the circuitry of the host device and the contacts of said connector. The discovery module is operable to detect the presence of a first characteristic impedance on either one of first and second contacts of said connector, and a second characteristic impedance on either one of third and fourth contacts of said connector, wherein the first, second, third and fourth contacts are different from each other. The path controller is configured to select either said first mode or said plurality of second modes in dependence on the detection of said first characteristic impedance. The path controller is configured to select, further to the selection of said plurality of second modes, one of said plurality of second modes in dependence on the value of said second characteristic impedance.

According to another aspect, there is provided a peripheral electronic device for connection to a host electronic device via a connector of the peripheral electronic device, the connector having a plurality of contacts arranged in a pattern having n-fold rotational symmetry, wherein n is an integer greater than one. The peripheral electronic device comprises: a pair of first characteristic impedances coupled to first and second contacts of said connector, the detection of which causing the host device to be placed into a first mode; one or more operative components coupled to at least a third contact of said connector, configured for at least one of transferring data to the host device and receiving data from the host device; and a second characteristic impedance, separate from said one or more operative components, coupled directly to one of a pair of rotationally symmetric contacts of said connector, enabling the host device to determine an orientation of the connector.

According to a further aspect, there is provided a method of controlling transfer of data between a host device and a peripheral device via a connector of the host device, the connector comprising a plurality of contacts having n-fold rotational symmetry, wherein n is an integer greater than one. The method comprises: detecting the presence of a first characteristic impedance on either one of first and second contacts of said connector, and selecting either a first mode of data transfer or a plurality of second modes of data transfer in dependence on the detection of said first characteristic impedance; detecting the presence of a second characteristic impedance on either one of third and fourth contacts of said connector, wherein the first, second, third and fourth contacts are different from each other; and selecting one of said plurality of second modes in dependence on the value of said second characteristic impedance, wherein each of the plurality of second modes corresponds to a respective configuration of signal paths between the host device and the peripheral device.

According to a yet further aspect, there is provided a data controller for controlling transfer of data between a host device and a peripheral device via a connector of the host device, the connector comprising a plurality of contacts having n-fold rotational symmetry, wherein n is an integer greater than one. The data controller comprises: a path controller for enabling signal paths between circuitry of the host device and contacts of said connector. The path controller is operable to enable separate signal paths to each of at least first, second, third and fourth contacts of the connector, wherein the signal paths to said first and second contacts are for the transfer of respective positive and negative audio signals for a first speaker of the peripheral device, and wherein signal paths to said third and fourth contacts are for the transfer of respective positive and negative audio signals for a second speaker of the peripheral device.

Another aspect provides an electronic device comprising a connector comprising a plurality of contacts having n-fold rotational symmetry, wherein n is an integer greater than one; and a data controller as set out above.

A further aspect provides an electronic accessory device for connection to a host electronic device via a connector of the electronic accessory device, the connector comprising a plurality of contacts having n-fold rotational symmetry, wherein n is an integer greater than one. The electronic accessory device further comprises a transducer coupled only to first and second contacts of said connector, wherein the first and second contacts are located at rotationally symmetric positions on the connector.

One aspect provides an apparatus, comprising: an audio codec for providing audio signals to a peripheral device; a path controller for enabling signal paths between the audio codec and contacts of a connector of a host device, the connector comprising a plurality of contacts having n-fold rotational symmetry, wherein n is an integer greater than one, the path controller being operable to enable separate signal paths between a first amplifier of said audio codec and at least one first contact of said connector, and between a second amplifier of said audio codec and at least one second contact of said connector, the at least one first contact and the at least one second contact being located at rotationally symmetric positions on said connector; and a discovery module operable to detect the presence of a characteristic impedance on at least one contact of said connector, and so determine an orientation of a connector of the peripheral device with respect to the connector of the host device. The audio codec is operable in a first mode of operation to provide audio signals via the first amplifier, and a second mode of operation to provide audio signals via the second amplifier. The path controller is operable to select between the first and second modes of operation in dependence on the orientation of the connector.

A further aspect provides an electronic device comprising: a connector having n-fold rotational symmetry, wherein n is an integer greater than one, and an apparatus as recited above.

Another aspect provides an electronic device, comprising: an application processor; a wireless modem; a connector, for connecting the electronic device to an accessory device; an audio codec, coupled to the application processor, the wireless modem and the connector, for at least one of providing audio signals to the connector and receiving audio signals from the connector; and a first digital interface, configurable to provide a first signal path for signals between the application processor and the connector. The audio codec comprises a second digital interface configurable to provide a second signal path via the audio codec for signals between the wireless modem and the connector.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
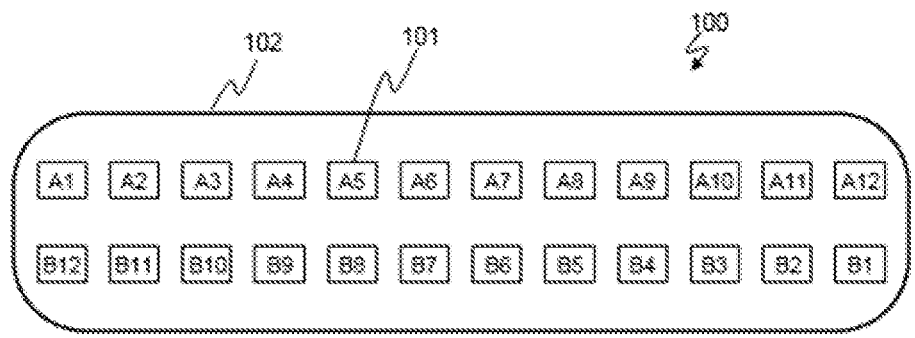
FIG. 1 illustrates the USB Type-C connector arrangement.

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

Embodiments of the present disclosure relate to methods and apparatus for peripheral device discovery, the detection of orientation of a connector having multiple degrees of rotational symmetry, and the provision of appropriate signal paths between a host device and a peripheral device. Some embodiments provide a characteristic impedance within the peripheral device that is coupled between rotationally symmetric contacts of the connector and thus enables detection of the connector orientation. The value of the characteristic impedance may be used in some embodiments to determine the type or model of peripheral device. Some embodiments are concerned with the enablement of appropriate signal paths to a peripheral device having a transducer (e.g. a loudspeaker) coupled only to rotationally symmetric contacts of the connector, such as headphones implemented in a "balanced" configuration.

Recently a new, compact 24-pin connector USB Type-C has been proposed. The USB type-C connector is a reversible connector, i.e. it has two-fold rotational symmetry and is designed to be operable with a type-C plug mated with a type-C receptacle in either possible mating orientation. The type-C connector is designed to be suitable for data transfer according to the present USB 3.1 specification for high data rate transfer and the USB type-C connector is, for example, particularly suitable for passing digital data at high data rates for e.g. video data transmission.

As used in this disclosure the term "USB type-C" or just "type-C" shall be taken to refer to compatibility with the USB type-C specification, which at the time of writing is the "USB Type-C™" Cable and Connector Specification Revision 1.2, Mar. 25, 2016, available (at the time of writing) from the USB organisation website at: http://www.usb.org/developers/docs/, the contents of which are incorporated herein by reference thereto. The term type-C shall be taken to mean any connector which is compatible with the release 1.2 specification identified above or compatible with the specification as it may be modified in the future.

Aspects of the invention are thus described below with respect to the USB type-C connector. However, those skilled in the art will appreciate that the invention is applicable to other similar present or future connectors and in particular any future rotationally symmetric connectors (i.e. connectors with a plurality of pins arranged in a rotationally symmetric pattern). The invention is thus not limited to USB type-C connectors unless otherwise explicitly stated in the claims appended hereto.

FIG. 1 illustrates the principles of a USB type-C connector 100. The connector has two rows of pins or contacts 101, with twelve pins in each row. Note that as used in this specification the term pin in relation to a connector shall mean an electrical terminal that may establish an electrical connection with a corresponding terminal of another connector when the connectors are correctly mated and the term contact shall mean the same. The pins are arranged so that the rows are rotationally symmetric (of order 2). By convention the pins in one row are identified as A1 to A12 and the pins of the other row are labelled B1 to B12. For ease of reference the pins are numbered so that a pin of a type-C receptacle, i.e. a socket or similar type of mating connector that may for instance be provided in a host device, has the same number as the pins of a type-C plug that might mate with that connector. The numbering of the pins of the receptacle may increase in a generally clockwise fashion as illustrated in FIG. 1, i.e. FIG. 1 illustrates the pin labelling for a view looking into the mouth of a type-C receptacle. For a type-C plug the numbering, as seen from a view looking into the plug, would instead increase in an anti-clockwise direction. Thus pin A3 say of a receptacle would mate with pin A3 of a corresponding plug or pin B3 if the plug was inserted in the rotated orientation.

The pins of type-C connector may be provided at least partly surrounded by a guide 102, which could for instance be the walls of a socket or, for a plug, some protective/guiding sheath, which may also be rotationally symmetric and may for instance have the form of a rounded rectangle.

As mentioned above the USB Type-C connector is designed to be suitable for fast digital data transfer, as well as power delivery, and can be seen as a general purpose or multi-purpose data connector. Whilst primarily envisaged for use for digital data transfer the USB Type-C specification describes that a stereo headset may be connected to a host device via a type-C receptacle of the host device by use of a separate adapter with a jack socket for a standard 3.5 mm TRRS audio jack plug and with a USB-type C plug. Annex A of the USB type C specification describes this (Audio Accessory Adapter Mode).

Figure 2:
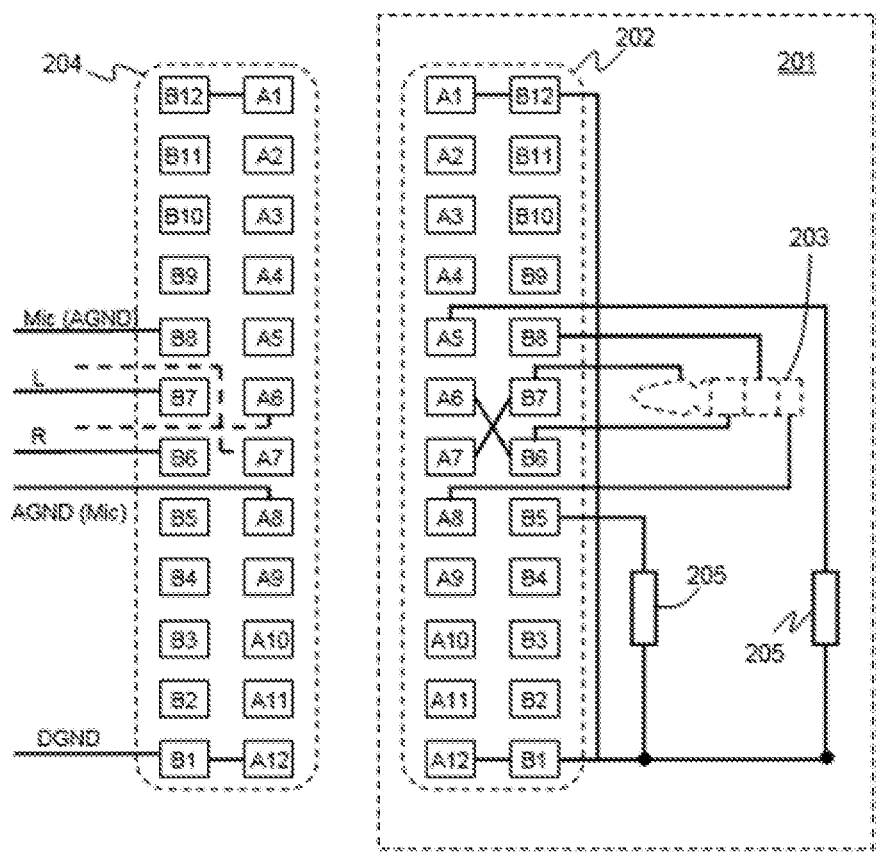
FIG. 2 illustrates a USB Type-C to audio jack adapter.

FIG. 2 illustrates an example of how a USB Type-C adapter may be used to connect to a legacy peripheral audio device via a standard TRRS jack connector. FIG. 2 illustrates an adapter 201 which includes a Type-C compatible plug 202 and a jack socket 203 for receiving a 3.5 mm TRRS jack plug. In use the USB Type-C plug 202 may be connected to a USB type-C receptacle 204 of a host device and the jack socket 203 may be mated with a jack plug (shown dotted) of a peripheral device such as a headset. In practice the USB plug 202 of the adapter may be connected to the jack socket 203 via a length of suitable cable or both may be enclosed in a common body, e.g. a plastic moulding.

The central four pins of each row of the type-C connector are used in Audio Accessory Adapter Mode, e.g. to provide a ground path and for data transfer. Pins A7 and B7 of the adapter plug 202 may be shorted together and connected to a tip contact of the jack socket. Pins A6 and B6 of the adapter plug 202 may be shorted together and connected to a first ring contact of the jack socket. This means that, when mated, pin B7 of the receptacle will be connected to the tip contact of the jack socket, whether via pin B7 of the plug 202 in one orientation or via pin A7 of the plug 202 in the other orientation. Likewise pin B6 of the receptacle will be in contact with the first ring contact. As is conventional the tip contact is for left audio data and the first ring contact is for right audio data and so analogue audio data for the left speaker may be transmitted from the host device via pin B7 of the receptacle (or equivalently pin A7) and analogue audio data for the right speaker may be transmitted via pin B6 (or equivalently pin A6).

Pin A8 of the plug 202 is connected to the sleeve contact and pin B8 of the plug 202 is connected to the second ring contact. When the plug 202 is mated with the receptacle, pin A8 of the receptacle will thus be connected either to the sleeve contact or second ring contact depending on orientation, with pin B8 of the receptacle being connected to the other of these two contacts. As is conventional the second ring contact and sleeve contact are used for receiving the microphone signal and a ground for the accessory (termed analog ground). However, different manufacturers have different standards and thus it is conventional for a host device to be able to determine whether a contact is used for the microphone signal or ground. Conventional discovery techniques can therefore be applied in the host device to the signal path(s) established by receptacle pin A8 and/or B8 to determine which path is a microphone path and which is ground.

For identification and discovery purposes the adapter 201 includes impedances 205 connected between plug pins A5 and B5 respectively and a common connection between plug pins A1, B12, B1 and A12. When mated at least one of the plug pins A1, B12, B1 and A12 will be connected to a ground, referred to as digital ground. The host device can thus determine whether to operate in the Audio Accessory Adapter Mode, rather than other normal USB-related modes, by detecting the impedances 205 presented on receptacle contacts A5 and B5 when mated to adaptor 201.

Supervisory circuitry in the USB interface (not shown) may detect the impedances on the defined CC (configuration channel) contacts (pins A5 and B5) to sense the presence as well as the type of USB peripheral attached. Thus, on insertion of a type-C plug 202 into the receptacle 204 or on power-up or restart, the USB supervisory circuitry of the host device may perform conventional USB Type-C discovery. A standard Cable Detect (CD) function may be implemented by the host device in order to determine whether a plug is connected, and whether to a DFP (downstream facing port) or UFP (upstream facing port), as well as the orientation of the cable. This mechanism may rely on applying pull-up and pull-down resistors or current sources to the CC1 (A5) and CC2 (B5) pins and sensing a variety of voltage points associated with these lines.

The USB type-C specification defines two characteristic impedances Rd and Ra (where Rd>Ra). As a downstream facing port, the USB system may effectively look for characteristic impedances Rd or Ra being connected to the CC pins and, if it is determined that a connection is present, the combination of impedances present at the CC pins may be used to determine the type of connection and the orientation. Thus for example an impedance Rd connected to one CC pin with the other being open defines that a UFP is attached and provides the orientation by virtue of which CC pin is connected to Rd. An impedance Rd at one pin and Ra at the other implies a powered cable with a UFP attached whereas an impedance of Ra at one pin with the other being open implies a powered cable without a UFP.

If both pins A5 and B5 are connected to digital ground by an impedance less than a value Ra (wherein Ra equals 1.2 kohm) then the Audio Accessory Adapter Mode may be initiated. In the embodiment shown in FIG. 2, each of the impedances 205 has a characteristic value of less than 1.2 kohms.

The Audio Accessory Adapter Mode thus provides a method of using a USB Type-C connector to operate a peripheral audio device by transmitting and receiving analogue audio data. The method is capable of data transfer with a peripheral device having two loudspeakers and a single microphone via a suitable adapter. However, it would be advantageous if the audio accessory adapter mode could be applied to control data exchange with multiple different peripheral devices. Further, whilst an adapter may be required to allow use with legacy peripheral devices, future peripheral devices could be provided with a USB Type-C connector using the same principles, allowing direct connection via a captive cable, thus avoiding the need for a jack plug and jack socket.

Figure 3:
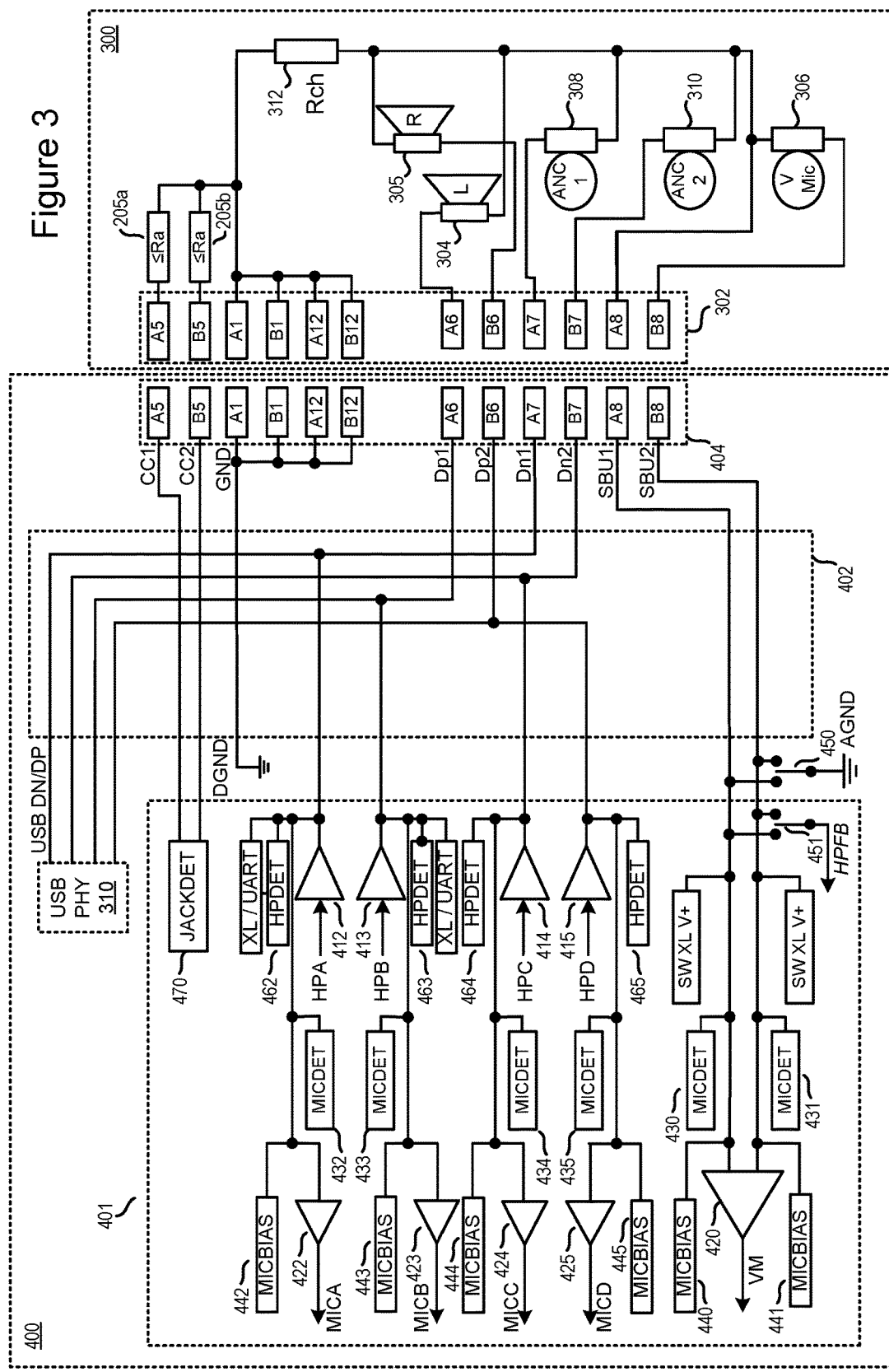
FIG. 3 illustrates a peripheral device and host device with connector arrangements according to an embodiment.

FIG. 3 shows a peripheral device 300 and a host device 400, and their respective connections, according to an embodiment of the invention.

In this embodiment the peripheral device 300 comprises various speakers 304, 305, and microphones 306, 307, 308, and is connected to the host device 400 via a pair of connectors 302 and 404. The host device 400 comprises headphone amplifiers 412, 413, 414, 415 suitable for driving speakers and comprises microphone amplifiers 420, 422, 423, 424, 425, for buffering and amplifying signals from microphones.

The input signals HPA, HPB, HPC, HPD to the headphone amplifiers are received via upstream signal paths from upstream circuitry, which may in turn derive these signals from signals received via signal paths from signal sources further upstream, possibly external to the host device via wired or wireless connections. The signal paths and processing from the original sources to the connector can be configured so as to deliver appropriately derived signals to respective ones of possibly multiple speakers.

The microphone amplifier output signals VM, MICA, MICB, MICC, MICD may be passed via downstream signal paths via downstream circuitry for processing or for onward transmission or storage via further downstream signal paths. The signal paths and processing from the connector pins via the microphone amplifiers to the eventual desired signal destination may be configured so as to derive signals from appropriate microphone or microphones and deliver these signals to respective eventual destinations.

As illustrated the headphone amplifiers and microphone amplifiers may be co-integrated, possibly together with ADCs or DACs or signal processing circuitry or other circuitry on an integrated circuit 401, for example an audio codec integrated circuit.

The peripheral device 300 in this embodiment is a set of headphones comprising multiple microphones. Thus the device 300 comprises a left speaker 304, a right speaker 305, and a microphone 308 used, for example, to acquire voice input from a user of the device 300. In addition, the peripheral device comprises two microphones 306, 307, one for noise cancellation for each loudspeaker, e.g. microphones positioned to pick up ambient noise signals at the left or right loudspeakers respectively or feedback noise cancellation microphones for the loudspeakers. Thus, unlike the accessory illustrated with respect to FIG. 2, an accessory according to embodiments may comprise more than three audio transducers.

The device 300 further comprises a connector 302, which may be a USB type-C connector as defined previously. In some embodiments the USB Type-C plug may be hardwired to the accessory body and thus the connection may comprise a captive cable. In some embodiments, however, the connector 302 may form part of an adapter and have a device specific connector, such as a socket (not shown in FIG. 3), for connecting to the body of the peripheral device. For consistency, the examples below will be described by reference to an accessory or peripheral with a type-C plug connector, i.e. where plug and connections are part of the accessory 300. Those skilled in the art will appreciate that the alternative arrangements discussed above are also possible.

In the embodiment of FIG. 3, rather than tie the left speaker to both pins A6 and B6 of the USB connector, and the right speaker to A7 and B7 as described with respect to FIG. 2, these four pins are allowed separate connections.

Only a subset of the contacts of the connector 302 are shown, for clarity. The other contacts not illustrated are either not used, or used for purposes other than the transfer of data to and from the illustrated components of the peripheral device 300, e.g. extra pins for the transfer of power, pins for high-speed digital data, etc. These contacts are not germane to the invention and are thus omitted from the description.

Each of the audio components of the device 300 (i.e. the speakers 304, 305, and microphones 306-308) are coupled between a respective contact of the connector 302, individual to that component, and a common contact that may be held at a reference voltage, e.g. analog ground. For example, in the illustrated embodiment, the left speaker 304 is connected between pins A6 and A8; the right speaker 305 is connected between pins B6 and A8; the first noise-cancellation microphone 306 is connected between pins A7 and A8; the second noise-cancellation microphone 307 is connected between pins B7 and A8; and the voice microphone 308 is connected between pins B8 and A8. Pin A8 serves as the common contact. To avoid possible ground loops, this contact is not connected to any external ground at the accessory but rather is connected to a suitable ground connection in the host device via the connector. In FIG. 3 a suitable ground connection may be supplied via host device connector pin A8 to host device analogue ground node AGND, via switch 450.

Respective first terminals of characteristic impedances 205a, 205b are connected to the CC pins A5 and B5. Respective second terminals of characteristic impedances 205a, 205b are connected together and to the digital ground pins A1, B1, A12 and B12. As explained above, these each have a value below 1.2 kohms (i.e. below Ra).

In addition, however, the peripheral device 300 may comprise a further characteristic impedance 312 Rch coupled between the reference voltage pin B8 and the digital ground contacts A1, B1, A12, and B12 (which are tied together). The utility of this further characteristic impedance will be discussed in greater detail below.

The host device 400 comprises a receptacle connector 404 that corresponds to the plug connector 302, and thus in some embodiments the receptacle 404 may be a USB type-C receptacle. When the plug connector 302 is mated with the receptacle connector 404, in one orientation of the plug relative to the receptacle, receptacle pin A6 will mate with respective plug contact A6, and thus be connected to the left loudspeaker 304, and receptacle contact B6 will mate with respective plug contact B6 and be connected to the right loudspeaker 305. In the other possible orientation, receptacle contact A6 will instead mate with plug contact B6 and be connected to the right loudspeaker 304, and receptacle contact B6 will mate with plug contact A6 and be connected with the left loudspeaker 304. Similarly depending on the orientation receptacle pin A7 will mate with plug pin A7 or B7 and be connected to the first or second noise cancellation microphones, with receptacle pin B7 mating with the other contact.

The signals to be played back from the speakers will generally have been supplied from some upstream audio signal source, for instance an mp3 file, and may be processed digitally to provide multiple digital data streams, for instance left and right channel digital data streams. The signal paths from the source via any digital-to-analogue conversion and the headphone amplifiers to the receptacle contacts must be configured such that at each receptacle contact the appropriate signal appears, consistent with the identity of the speaker connected to that contact via the connection to the plug contacts, which speaker may be different according of the orientation of the connector.

Similarly, the signal paths to downstream processing nodes from contacts associated with the noise cancellation microphone signals via the microphone amplifiers need to be consistent with the identity of the microphone signal appearing on that contact, which may be different according of the orientation of the connector.

The host device may therefore comprise a data controller for controlling transfer of data between a host device and a peripheral device via a connector, such as a USB type-C connector, of the host device. The data controller may comprise a path controller or path control module for enabling signal paths between circuitry of the host device and contacts of the connector. When the host device is connected to an accessory device requiring analogue audio signal paths the path controller is operable in a plurality of different modes to enable different signal paths between the host device 400 and the peripheral device 300.

The path controller may enable signal paths by operating one or more switches to establish a signal path between a component in the host device 400 and a pin of the connector (e.g. connecting an amplifier output to the pin, an amplifier input to the pin, etc). Alternatively, the path controller may enable signal paths by activating or deactivating components that are permanently connected to a particular pin of the connector. For example, a signal path from the output of an amplifier may be enabled by activating the amplifier, and deactivating other components connected to the pin.

Note that as used herein the term signal path shall refer to a path that is actually used or intended for use for the transfer of data and an audio signal path shall be interpreted accordingly. Thus such a signal path may be a path that transfers data for driving a loudspeaker for example or for readout of a microphone. A connection enabling a ground return, although possibly necessary for operation of a component, shall not be taken to be a signal path for transfer of data (although for the avoidance of doubt a microphone signal path may be a pseudo-ground, e.g. for connection to a differential microphone amplifier input independently of a ground current return from loudspeakers). Likewise any connection for providing purely a supply voltage to a component would not constitute a signal path for the transfer of data (although for the avoidance of doubt a microphone signal path may be a phantom power supply, i.e. provide power supply current via a significant source impedance the voltage across which is modulated according to a microphone signal as is commonplace for analogue electret microphones).

It will further be appreciated that since contacts A6 and B6 and also contacts A7 and B7 are no longer shorted together, the ambiguity on the orientation of the plug relative to the receptacle requires some electrical method of determination before the path controller can establish the appropriate signal paths. Thus the host device may be configured to determine a connection configuration for the peripheral device, i.e. an indication of whether the pins A6, A7, B6 and B7 are connected to loudspeakers or microphones of the peripheral device.

The host device or the data controller thereof may therefore comprise a discovery module or discovery controller configured to monitor the electrical properties of at least one contact of the receptacle connector 404 of the host device to determine a type of connection for that contact. The connection configuration may then be determined based on the type of connection determined for at least one contact of the connector and a plurality of predetermined possible connection configurations.

In one embodiment pin B8 of the plug connector 302 of the accessory device may be used for the voice microphone 308 and pin A8 for the common ground return pin. In one embodiment the connections in the accessory device 300 may be restricted such that only a predefined arrangement with respect to the ground return pin is allowed. In other words the set of possible configurations for an allowed accessory device, i.e. arrangement of loudspeakers and microphones in the accessory and their connections to the type-C plug, may be limited, e.g. to just one allowed configuration, for instance that illustrated as accessory device 300 in FIG. 3. This would consequently limit the set of possible connections, e.g. to just two possibilities due to the two possible mating orientations of the type-C plug to the type-C receptacle.

In such an embodiment in use the host device may determine which of receptacle pins A8 or B8 appears connected directly to the common ground return connection of speakers and microphones of the accessory device rather than appearing connected via the impedance of microphone 308, and thus determine the relative orientation of the plug.

The codec circuit 401 thus comprises microphone detect blocks (MICDET) 430, 431 coupled to pins A8 and B8 in the receptacle connector 404. The MICDET blocks can be employed during power-on or start-up, to identify the presence of the voice microphone on either pin A8 or B8, and may then be subsequently deactivated so as not to interfere with the microphone signals.

The codec additionally comprises microphone biasing circuits (MICBIAS) 440, 441, and a voice microphone (Voice MIC) amplifier 420 with a pair of differential inputs coupled to the same contacts as the MICDET blocks. Depending on the decision made by the MICDET blocks, either MICBIAS circuit may be used to provide the necessary biasing voltage to allow the voice microphone 308 to function without a separate power source in the accessory device 300.

The codec additionally comprises a voice microphone (Voice MIC) amplifier 420 comprising a pair of differential inputs coupled to the same contacts A8, B8 as the MICDET blocks. This amplifier provides an output signal VM derived from the voltage difference between the two contacts A8 and B8. The magnitude of this difference signal is unaffected by which of the two pins is connected to which terminal of the voice microphone; only the polarity will change, and this may be corrected appropriately in the downstream signal processing.

The differential nature of the microphone amplifier and the selective activation and deactivation of the MICDET and MICBIAS blocks means that no series switches are required on the connections between the pins A8, B8 and the voice microphone amplifier.

As mentioned above, the host device contact A8 or B8 which is determined by the MICDET circuitry to be connected to the common ground return contact of the accessory device may be connected to ground via one pole or the other of switch 450, connected to the analog ground node AGND of the host device.

It is further noted that any common ground return voltage appearing on the respective host device connector contact A8 or B8 may be passed to any of the headphone amplifiers 412-415 via switch 451 as headphone feedback signal HPFB, to enable such voltage drops, for example due to microphone or speaker return ground currents passing through the on-resistance of switch 450 to be cancelled from signals provided to the speakers 304, 305.

In the above embodiment the connections in the accessory device 300, i.e. arrangement of loudspeakers and microphones in the accessory and their connections to the type-C plug, were assumed to be limited, e.g. to just one allowed configuration, for instance that illustrated as accessory device 300 in FIG. 3. Thus the set of possible connections were limited e.g. to just two possibilities due to the two possible mating orientations of the type-C plug to the type-C receptacle.

However, if a wider range of possibilities is to be tolerated, for instance some other mix of speakers and microphones, then other electrical measurements may be required, say of the impedances from other contacts to the determined ground line.

In this regard, it can be seen in the embodiment illustrated in FIG. 3 that the B7 pin of the receptacle connector 404 is coupled directly to a number of components within the codec 401. For example, the B7 pin is coupled to the output of amplifier 414, a headphone detect (HPDET) block 464, a respective microphone bias (MICBIAS) block 444, microphone detection circuitry 434, and the input of a microphone amplifier 424. Pin B7 may also be connected to a pin of a USB PHY block 310 which may be activated to allow operation when connected to an accessory requiring an interface in standard USB mode or deactivated for operation in Audio Accessory Adapter mode. Note that each of these components in the illustrated embodiment may be permanently connected to the B7 pin, without switches in the area 402 to decouple them. The number of different components on this line is illustrative of the number of different signals that may be sent or received over the B7 pin according to the type of peripheral device coupled to the receptacle connector 402 and the different potential orientations of the plug connector 302 within the receptacle connector 402.

For example, the HPDET block 464 may be used to test the connection on the B7 pin and to allow determination of whether the component connected to the plug connector B7 pin is a loudspeaker or a microphone. HPDET block 464 may for example inject a known current into pin B7 with the ground return accessory pin connected via host connector pin A8 or B8 to ground via switch 450 and measure the resulting voltage. The applied current may be small and applied gradually to avoid audio artefacts. Other such methods are known by those skilled in the art.

In the illustrated embodiment, where the peripheral device 300 is a set of headphones with multiple microphones, the component connected is a noise-cancellation microphone 307, i.e. a microphone arranged to pick up ambient noise in the vicinity of the left speaker 304. The MICBIAS circuit may therefore be activated to provide a biasing voltage to the microphone 307, while the error amplifier may also be activated to receive the noise signals output by the microphone 307 superimposed on the bias voltage on this line. The headphone amplifier may be deactivated so as not to drive signals to the microphone or to prevent significant loading on the line.

A similar arrangement exists for the A7 pin, which in the illustrated embodiment is coupled to the other noise-cancellation microphone 306. Thus the A7 pin is coupled to the output of another amplifier 412, a headphone detect (HPDET) block 462, a respective microphone bias (MICBIAS) block 442, a microphone detect block 432, and the input of a microphone amplifier 422. The A7 pin may be additionally coupled to a data interface block (XL/UART), or a pin of USB PHY 310. Thus the HPDET block 462 may be able to test the connection on the A7 pin and determine whether the component connected to the plug connector A7 pin is a loudspeaker or a microphone.

In the illustrated embodiment, the B6 pin of the receptacle connector 402 is also connected to a number of components within the codec 401, including the output of a headphone amplifier 415, a headphone detect (HPDET) block 465, a respective microphone bias (MICBIAS) block 445, a microphone detect block 442, and the input of a microphone amplifier 425. The corresponding B6 pin in the plug receptor 302 is coupled to the right speaker 305 of the peripheral device 300, and thus in operation the HPDET block is able to detect the presence of a speaker on the B6 pin. The amplifier 415 may thus be activated to output analogue audio signals over the signal path via pins B6 and drive the right speaker. The microphone bias (MICBIAS) block 445 may then be deactivated to avoid loading the signal line.

The A6 pin of the receptacle connector 402 is connected to similar components in the codec 401 for driving the left speaker 304 of the peripheral device 300.

In addition to these connections, the codec 401 may comprise circuitry 470 (JACKDET) to detect the impedances on the defined CC (configuration channel) contacts (pins A5 and B5) to sense the presence as well as the type of peripheral device attached. Thus, on insertion of a plug into the receptacle 404 or on power-up or restart, the codec 401 may perform conventional USB Type-C discovery. A standard Cable Detect (CD) function may be implemented by the host device in order to determine whether a plug is connected, and whether to a DFP (downstream facing port) or UFP (upstream facing port) and the orientation of the cable. This mechanism may rely on applying pull-up and pull-down resistors or current sources to the CC1 (A5) and CC2 (B5) pins and sensing a variety of voltage points associated with these lines. In the illustrated embodiment, the codec 401 detects the presence of characteristic impedances 205*a* and 205*b* (Ra) on both the A5 and B5 pins, and is able to enter the Audio Accessory Adapter Mode. In other embodiments this standard USB Type-C discovery may be executed by circuitry in the USB controller, which may then communicate the result to the codec. The detection of the removal of the impedances from these pins, signifying the removal of the plug from the receptacle, may be undertaken by JACKDET in the codec, to avoid delays in communication and consequent pops and clicks on removal.

Figure 4:
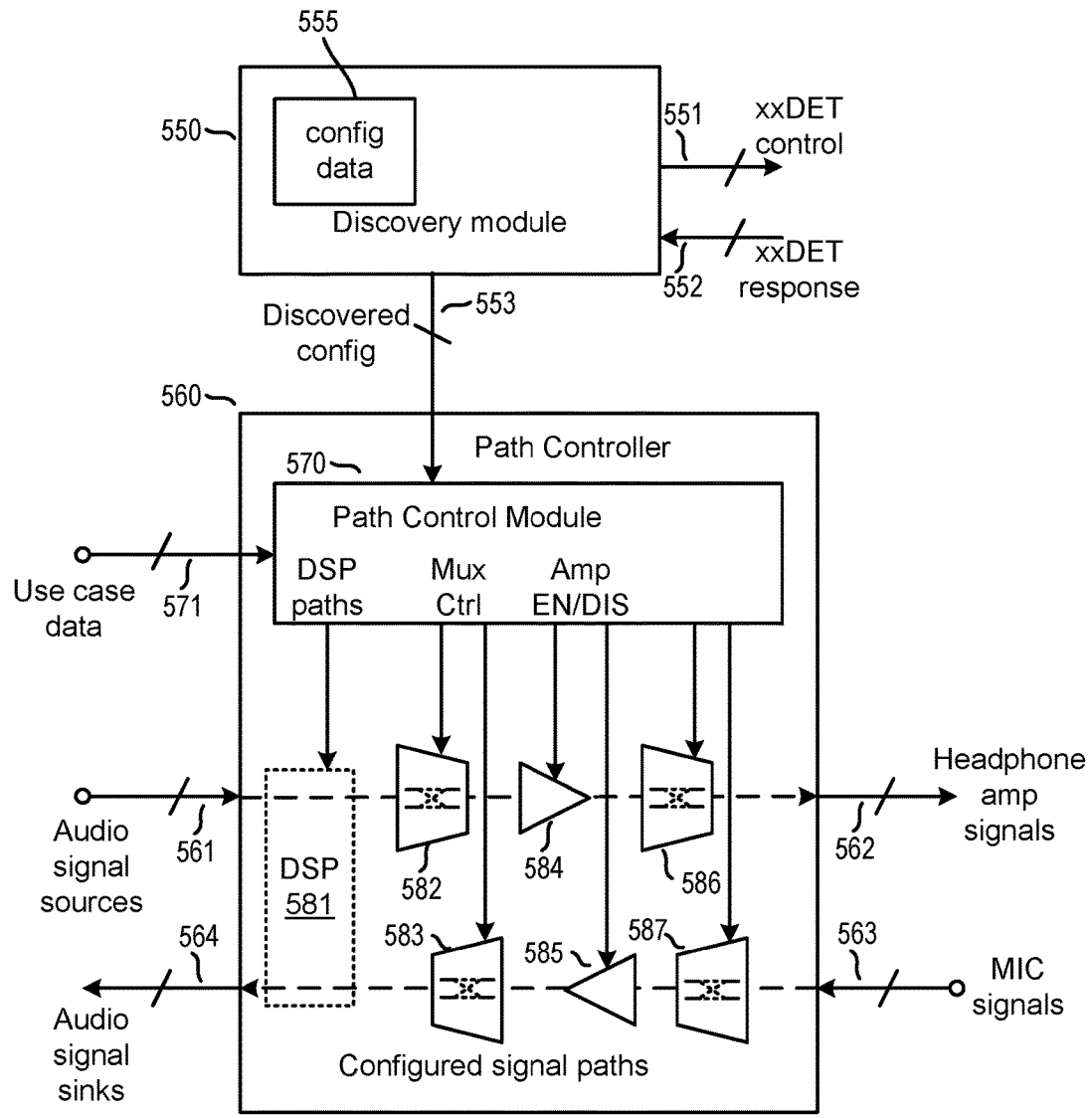
FIG. 4 illustrates a data controller according to an embodiment.

FIG. 4 illustrates a data controller comprising a path controller 560 and a discovery module 550.

Discovery controller or discovery module 550 may be configured to issue detection control signals 551 to the various detection blocks (e.g. HPDET or MICDET blocks) in the codec 401 to instruct them to generate or sense voltages or currents, and may be further configured to receive data 552 in response, indicative of the impedances connected to or between various nodes. Discovery module 550 also comprises a data storage module 555 configured to contain data representing a plurality of pre-defined accessory configurations as observable from the host connector, i.e. including variants arising from relative rotation of the connectors. The discovery module 550 may also be configured to deduce from these indicative responses which of the possible accessory and connector configurations is currently connected, and communicate this information to the path controller 560 as discovered configuration data 553.

In some embodiments, the data storage module 555 may comprise a look-up table, and the discovery module 550 may comprise digital logic circuitry wired so as to perform the logical operations necessary to determine the accessory and connector configuration from the received data 552 in comparison to the data stored in the look-up table. In other embodiments the detection control signals or the deduction logic may be implemented on programmable controller circuitry, and the data storage module 555 may contain code for execution by the programmable controller, for instance incorporating appropriate if . . . then or case statements, coded or parameterised to compare the impedance detection results against accessory configuration possibilities pre-defined in the code.

Path controller 560 receives discovered configuration data 553 from the discovery module 550 and based on this, together with use case data 571, configures various circuitry to enable appropriate signal paths for outputting data to the accessory or receiving data from the accessory. For example, a signal path may be enabled for data 561 from audio signal sources to provide appropriate signals 562 for output transducers such as speakers in an accessory. Alternatively, or additionally, a signal path may be enabled for signals 563 from input transducers such as microphones in an accessory to provide appropriate data 564 to audio signal sinks in the host device. In some embodiments the signal paths controlled by the path controller may also allow output signals 562 to comprise components from input signals 563, for example to provide a telephone side tone signal or echo cancellation.

The audio signal source data 561 may be provided from circuitry in the host device. For example voice or music data may be stored in memory circuitry or received via a wireless controller circuitry from a local or telecommunications wireless network link. The audio signal sink data 564 may be supplied to circuitry in the host device. For example incoming voice or music may be recorded, stored in memory circuitry, or may be relayed via a wireless modem to some local or telecommunications wireless network.

The use case data 571 may be provided from an applications processor of the host device (not illustrated) or directly via user inputs such as touchscreen or button presses. This use case data may for example request that particular audio data comprised in data 561 be rendered in mono or stereo via speakers in an attached accessory or may for example request that signals from certain microphones are forwarded to audio sinks in processor circuitry for noise cancellation.

Path controller module 560 may comprise a path control module 570, which receives discovered configuration data 553 from the discovery module and based on this together with use case data 571 generates control data or signals to various circuitry in potential signal paths to enable an appropriate subset of signal paths. These control signals may comprise one or more of: enable or disable signals to output amplifiers 584 or input amplifiers 585; and control data for signal switching circuitry 582, 583, for example analog or digital switching matrices or multiplexers or the like, for example using MOS transmission gates or digital combinatorial logic. The control signals may comprise configuration data for a programmable processor 581, for example a Digital Signal Processor, for example to determine the address locations for respective streams of digital audio data, possibly before or after other signal processing.

In some cases the path controller may establish a path by switches 586, 587 in the path between an amplifier and the connector. For example, these switches may be located within the area 402 illustrated in FIG. 3.

The path controller may also issue control signals to enable or disable bias blocks, for example MICBIAS blocks. It may also enable or disable ground switches, for example to AGND.

The discovery module 550 and path controller 560 may be integrated in the audio codec 401, or may at least partly reside in other components of the host device 400. For instance the digital signal processor 581 may at least partly comprise a separately integrated digital signal processor circuit 565 in communication with the audio codec 401, which may process or provide channels of audio data in either direction, to or from the audio codec. The identity of the signals it provides to the codec may be configured by commands sent from the path control module 570 in the codec to this separate integrated circuit.

Returning to FIG. 3, the voice microphone 306 is connected between accessory pins A8 and B8, and there is no connection to ground within the accessory 300. Thus merely by applying voltages or currents only to these pins A8 and B8 it is not apparent which one is a common ground return connected to the speakers. It may be possible to deduce the polarity of the connection of the microphone by exploiting some asymmetry of the voltage-current characteristics of a known model of microphone, but this may not be possible for the wide variety of microphones that may be used in different models of accessory by different manufacturers.

To deduce the polarity of connection of the connector, the discovery controller may thus cause the HPDET blocks and the MICDET blocks to co-operate. For instance a HPDET block 463 or 465 may inject a current into the common ground return via one of the speakers while say receptacle pin B8 is grounded by controlling switch 450 and the voltage on pin A8 is monitored by MICDET 430. If host device pin A8 is connected to the common ground return of the accessory, i.e. accessory pin B8 is mating with the host pin A8, then little voltage will appear on pin A8. However, if host device pin A8 is connected to the other terminal of the voice microphone 306, i.e. accessory pin A8 is mating with the host pin A8, then the current injected will have to pass through the microphone 308 before reaching AGND, so there will be appreciable voltage developed on host pin A8. The polarity of the connection may therefore be determined by carrying out this process on both pins A8 and B8, in sequence, and comparing the voltages on the pins not connected to ground. Alternatively, the process may be carried out on a single pin, and the voltage on the pin not connected to ground compared with a predetermined threshold.

Numerous other similar possible discovery arrangements are possible, for example injecting current into pins A8 or B8 and using the speaker-connected pins to monitor any resulting voltage drop across the microphone. These methods all thus rely on access to one terminal of the microphone via the common ground return connected to at least one speaker.

Figure 5:
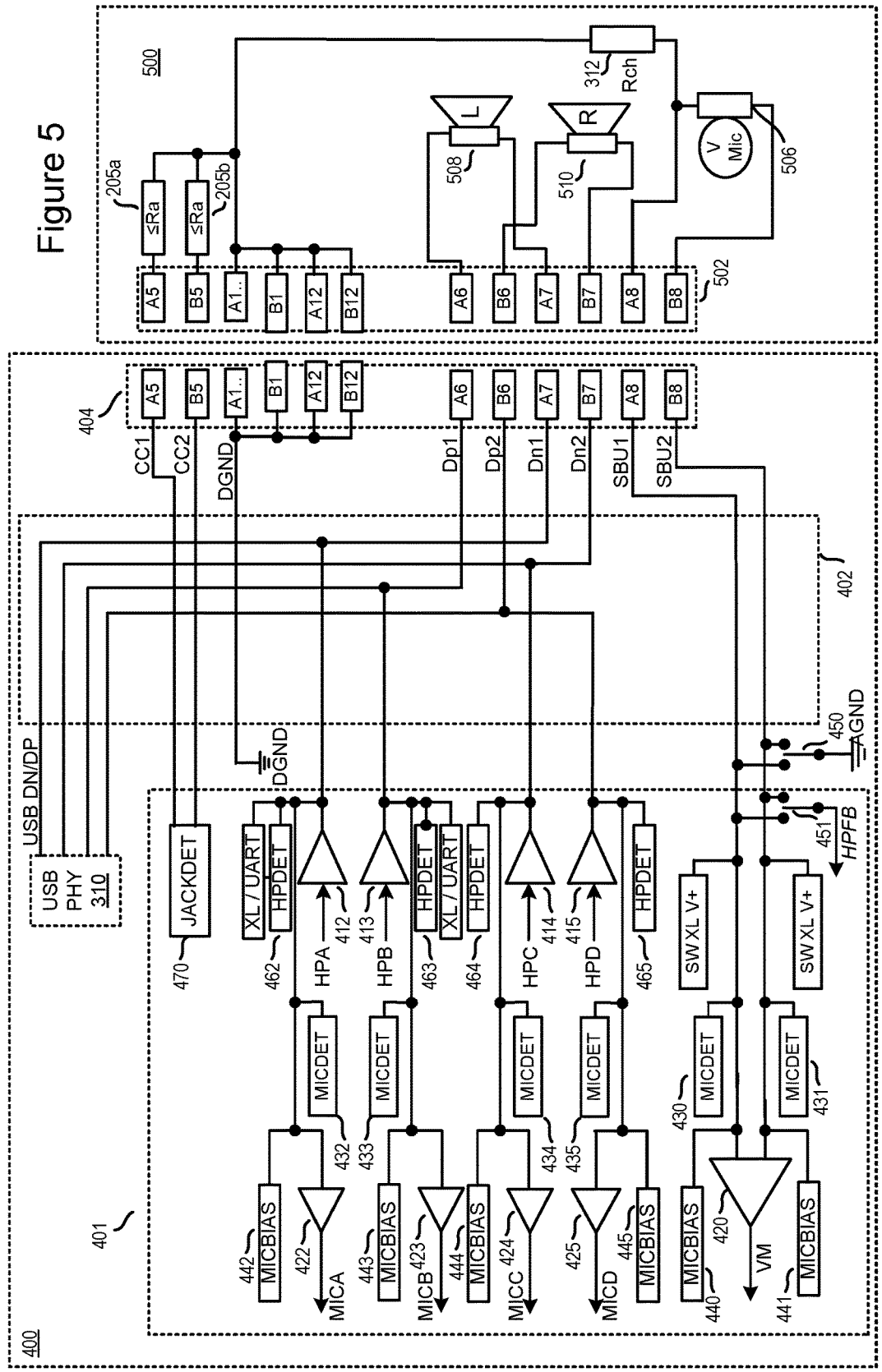
FIG. 5 illustrates a peripheral device and host device with connector arrangements according to another embodiment.

FIG. 5 illustrates the connection of a different accessory or peripheral device 500 to the host device 400. In this embodiment the peripheral device 500 comprises a pair of headphones each connected in a balanced configuration. Balanced headphone connection configurations are characterized by independent connections to each of the pair of terminals to each speaker voice coil, in contrast to the embodiment of FIG. 3 where more than one speaker in the accessory shares a common ground return connection.

The two terminals of the voice coil of a speaker connected in a balanced configuration may be driven by a pair of signals of equal magnitude but opposite polarity with reference to some reference voltage, which may be ground or some other reference (for example mid-supply-rail). There are various advantages to this connection. For a given supply voltage, the voltage across the coil may be doubled, thus increasing the maximum signal that can be applied and thus increasing the acoustic output power. The symmetric output voltage swings may also reduce common-mode electromagnetic interference (EMI) emissions, and the symmetric output impedance presented to the driving wires by the amplifiers may also help reduce sensitivity to external EMI.

In some applications, however, the speaker driving voltage may not be symmetrical, to obtain other advantages, e.g. various single-supply Class G or Class H implementations in which the supply voltage of the driving amplifiers may be varied according to the signal level to reduce power consumption, yet it is desired that the signal swing spans the supply voltage range existing at any given time. Thus the common-mode voltage may vary for example as half of the time-varying supply voltage. In further applications, for instance in switched-mode power supply (SMPS) amplifier topologies, an amplifier may operate to drive only one terminal of the voice coil at any one time and ground the other terminal, swapping these connections when the signal crosses zero voltage and its polarity reverses, rather than connecting the same terminal to ground all the time. Yet further applications may operate in a mixture of the modes.

Thus to enable such operating drive configurations the headphones 500 of this embodiment comprise a left speaker 508 coupled between pins A6 and A7 of the connector 502 of the accessory device, and a right speaker 510 coupled between pins B6 and B7. The headphones 500 may additionally comprise a voice microphone 506 coupled between pins A8 and B8. As before, the headphones 500 may further comprise characteristic impedances 205*a*, 205*b* on the A5 and B5 pins. The characteristic impedances are each less than 1.2 kohms (i.e. less than Ra), such that their detection leads to the interface entering the Audio Accessory Adapter Mode.

In this arrangement, where pins A6/A7, and B6/B7 are all connected to speakers, the codec 401 may be operated in a mode whereby each of the amplifiers 412, 413, 414, 415 for outputting signals to the headphones 500 is active, while each of the MICBIAS circuits 442, 443, 444, 445 (with the possible exception of the biasing circuit 440 or 441 for the voice microphone 506) and the corresponding microphone amplifiers are deactivated.

Figure 6A:
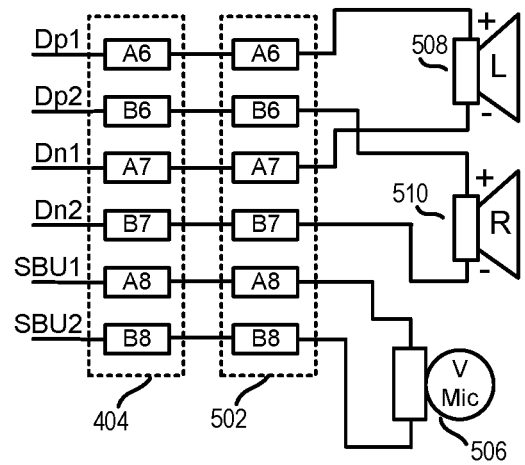
FIGS. 6a and 6b illustrate connector arrangements for a set of balanced headphones.
Figure 6B:
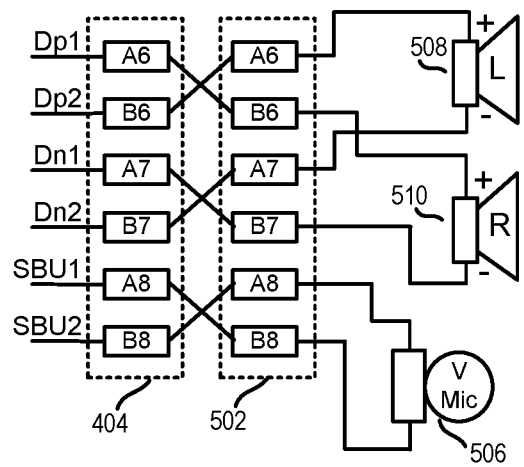

FIGS. 6*a* and 6*b* illustrate the connections of accessory 500 to the host device 400 in two relative orientations of the host device connector 404 and accessory connector 502.

In the orientation illustrated in FIG. 6*a*, pin A6 of the host device connector mates with corresponding pin A6 of the accessory connector, pin A7 with A7 and so forth. The left speaker 508 is driven by the signal applied between host pin A6 and adjacent host pin A7, the right speaker is driven by the signal applied between adjacent host pins B6 and B7. The microphone bias may be applied to host pin B8 which also carries a signal superimposed on it by the voice microphone 506, with host pin A8 carrying the ground return current from the microphone only.

In the orientation illustrated in FIG. 6*b*, pin A6 of the host device connector mates with the rotationally symmetrically disposed pin B6 of the accessory connector, pin A7 with B7 and so forth. The left speaker 508 is now driven by the signal applied between host pin B6 and host pin B7, the right speaker is driven by the signal applied between host pins A6 and A7. Thus the audio signal previously applied to the left speaker is now applied to the right speaker, and vice versa, unless this is corrected upstream, in the path controller for instance. Also unless the bias blocks are reconfigured in the host, the microphone if present will be reverse biased.

In the embodiment illustrated in FIG. 5, in contrast to that illustrated in FIG. 3, there is no electrical connection in the accessory 500 between any terminal of the voice microphone 506 and any terminal of any speaker. The discovery module is thus not able to determine the relative connector polarity by stimulating or monitoring combinations of the microphone or speaker terminals, i.e. by stimulating or monitoring pins A6, A7, A8 and B6, B7, B8 according to methods described as applicable to determine the relative connector polarity of the embodiment of FIG. 3.

Resistor 312 is thus included, to provide a characteristic impedance Rch between one terminal of the microphone and pins A1, B1, A12 and B12 which are tied together and mate with corresponding pins of the host device connector and are coupled to digital ground of the host device. This resistance thus provides an asymmetrical connection to digital ground, which may be detected by stimulating pins A8 or B8 with respect to the digital ground pins A1, etc.

Figure 7A:
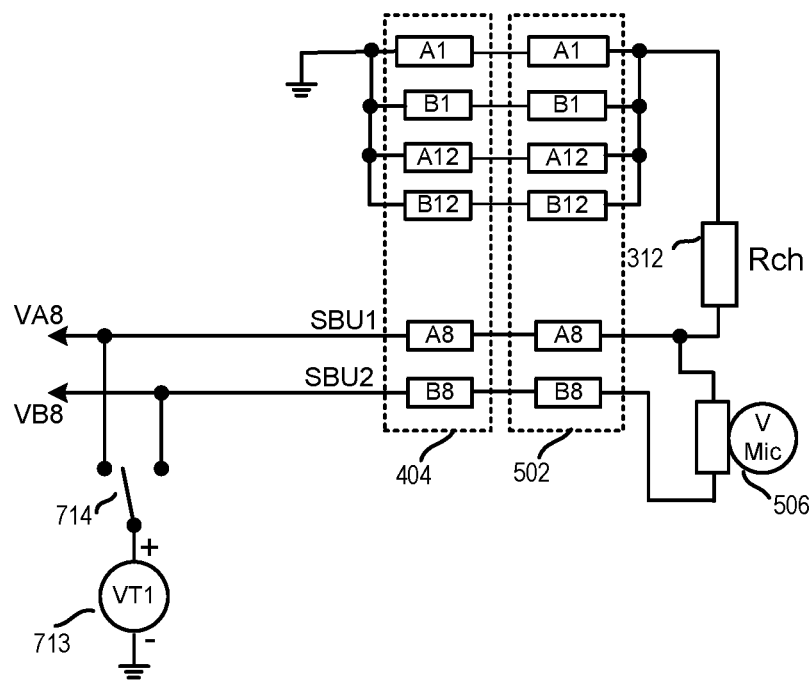
FIGS. 7a and 7b illustrate a mechanism for detecting the orientation of a connector and the type of peripheral device connected to a host device.
Figure 7B:
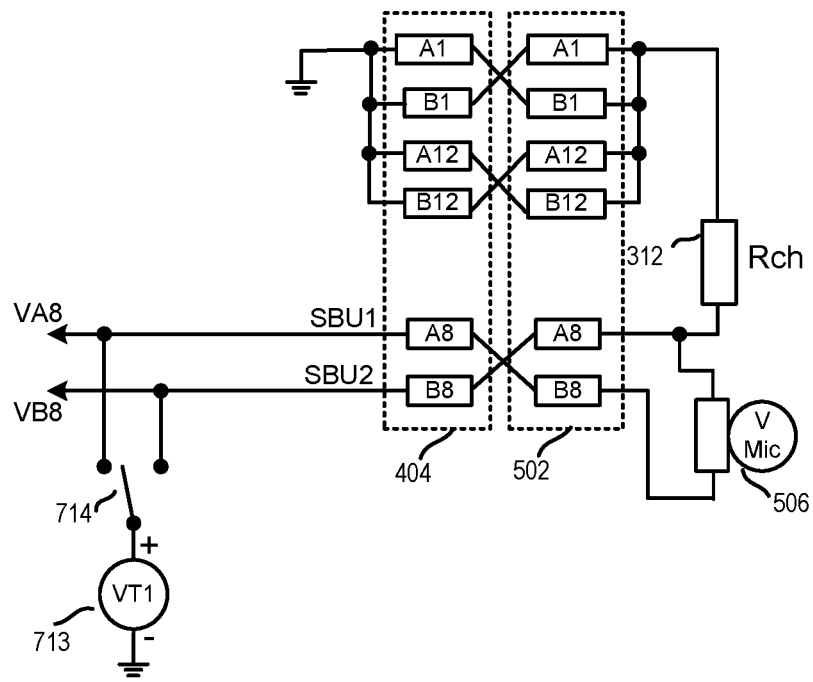

FIGS. 7a and 7b illustrate one method of detecting the presence of the characteristic impedance 312 Rch.

FIG. 7a illustrates detection when the connectors are mated with corresponding pins connected, e.g. A6 to A6 etc as shown in FIG. 6a. In a first measurement, voltage source VT1 may be applied to pin B8 of the host device connector such that Rmic (the impedance of the microphone 506) and Rch will provide a potential divider and a divided voltage will appear on pin A8. In a second measurement, voltage source VT1 may be applied to pin A8. Assuming there is no significant loading of pin A8 by the sense equipment or other circuitry attached to pin B8, then the voltage monitored on B8 will be substantially equal to VT1.

FIG. 7b illustrates detection when the connectors are connected with rotationally symmetrically disposed pairs of pins mated, e.g. A6 to B6, etc. If the same measurement sequence is repeated, then in the first measurement where voltage source VT1 is applied to pin B8 of the host device there is no potential divider effect and the voltage monitored on A8 will be equal to VT1. In the second measurement, where voltage source VT1 is applied to pin A8, Rmic and Rch will provide a potential divider and a divided voltage will appear on pin B8.

Thus based on which of the first or second measurements delivers a potentially divided voltage, i.e. results in a non-zero voltage across the microphone, the two possible orientations of the connector may be detected.

The voltage between pins A8 and B8 may be measured separately in the two measurements as respective single differential voltages, each differential voltage then being digitised, and then the two digitised voltages subtracted for comparison. Alternatively the voltage on A1 may be stored as an analog voltage from the first measurement and then subtracted from the voltage on pin B1 in the second measurement prior to digitisation. In each case the measurement result on which the decision is based may be obtained by directly detecting the voltage difference between two node voltages, simultaneously or sequentially, rather than measuring and digitising two voltages separately for each measurement and then subtracting them downstream.

Based on these measurements and the detection decision, the discovery module 550 may control the path controller 560 to alter the upstream signal paths or processing to compensate for the interchange of connector nodes to be driven or monitored.

Similar measurement techniques may apply controlled currents rather than voltages. Also further measurements may be taken across these and other pins to detect the presence and connections of the speakers or microphones of the accessory.

Normally Rch may be much greater than Rmic, to avoid significant coupling of any difference between host analog and digital grounds. Rch may be, for example, in the range 10 kohms to 1 Megaohm, whereas a nominal Rmic value may be approximately 300 ohms.

Figure 8A:
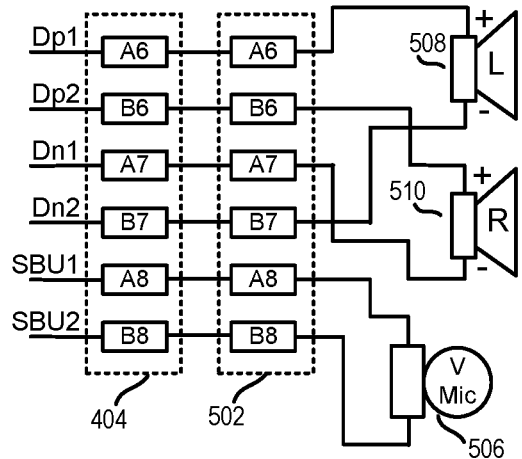
FIGS. 8a and 8b illustrate alternative connector arrangements for a set of balanced headphones.
Figure 8B:
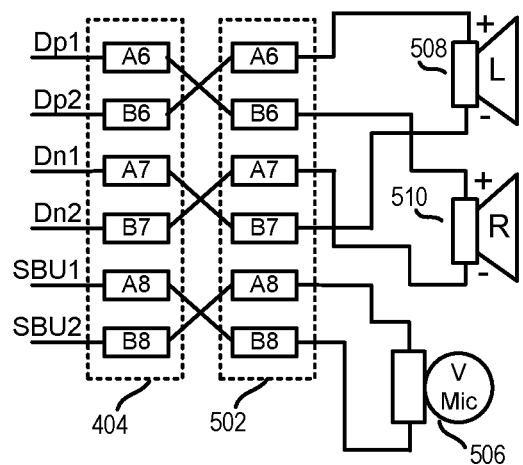

FIGS. 8a and 8b illustrate the connection of a further embodiment, where the accessory comprises components wired differently to the connector than the accessory illustrated in FIG. 5 and FIGS. 6a and 6b. In this case the left speaker is connected to accessory connector pins A6 and B7, i.e. to a pair of pins disposed opposite each other in the connector, as illustrated in FIG. 1, rather than pairs of adjacently disposed pins such as A6 and A7. Similarly the right speaker is connected between another pair of oppositely disposed pins B6 and A7.

In the relative orientation of the two connectors illustrated in FIG. 8a, pin A6 of the host device connector mates with corresponding pin A6 of the accessory connector, pin A7 with A7 and so forth. In the relative orientation of the two connectors illustrated in FIG. 8b, pin A6 of the host device connector mates with rotationally symmetrically disposed pin B6 of the accessory connector, pin A7 with B7 and so forth. The effect on the speaker connections is similar to that illustrated in FIGS. 6a and 6b: the left and right speakers are interchanged as regards connections to the host connector, and this change would require compensation in the upstream path controller.

An accessory such as this would still require additional components, such as a characteristic impedance Rch as shown in FIGS. 7a and 7b, to allow detection of the relative orientation of the otherwise symmetrically connected components.

Figure 9A:
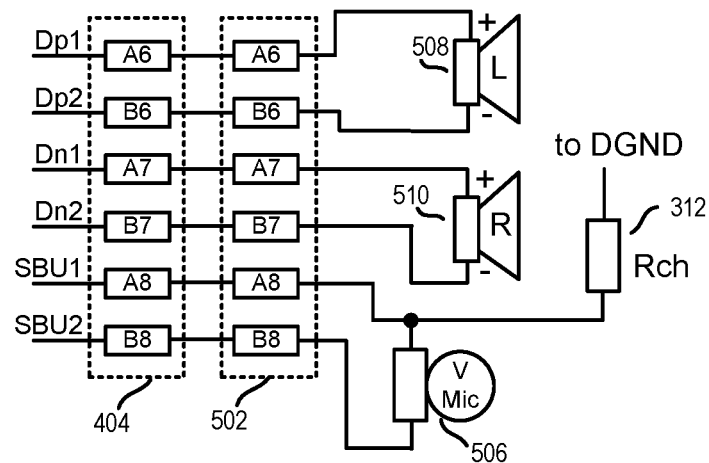
FIGS. 9a and 9b illustrate connector arrangements for a further peripheral device.
Figure 9B:
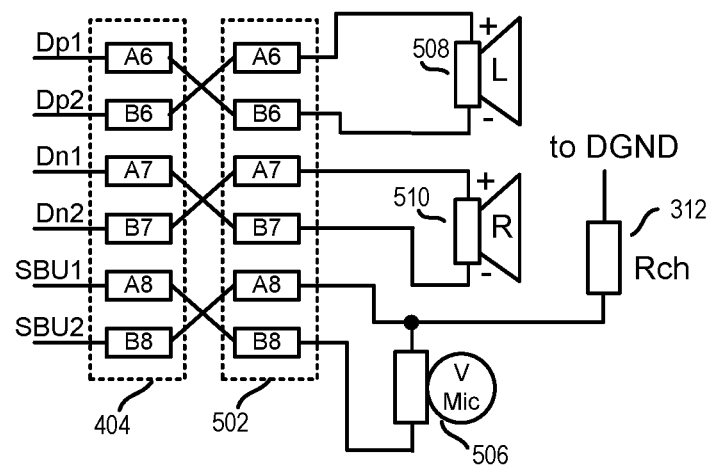

FIGS. 9a and 9b illustrate the connection of an accessory according to a further embodiment, where the accessory comprises components wired differently to the connector than accessories described above. In this case the left speaker is connected to accessory connector pins A6 and B6, i.e. to a pair of pins disposed diagonally opposite each other or in rotationally symmetric locations about the axis of rotational symmetry of the arrangement of pins. Similarly the right speaker is connected between another pair of rotationally symmetrically disposed pins B7 and A7.

In the relative orientation of the two connectors illustrated in FIG. 9a, pin A6 of the host device connector mates with corresponding pin A6 of the accessory connector, pin A7 with A7 and so forth. In the relative orientation of the two connectors illustrated in FIG. 9b, pin A6 of the host device connector mates with rotationally symmetrically disposed pin B6 of the accessory connector, pin A7 with B7 and so forth. The effect on the speaker connections is different that illustrated in FIGS. 6a and 6b: each of the left and right speakers are still connected between the same respective pair of pins. However the connections across each speaker are reversed. Thus the acoustic output of each would still correspond to the same channel, but both would be of opposite phase. In some applications this may be regarded as acceptable.

However, note that if there is a microphone present, there would still need to be some discovery of its orientation in order to bias and monitor it correctly, so a characteristic impedance Rch may still be included in the accessory and a discovery measurement process similar to that described above with respect to FIGS. 7a and 7b executed.

Figure 9C:
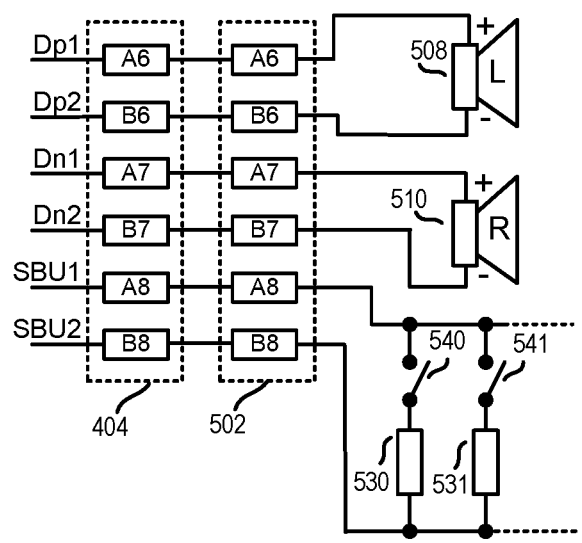
FIG. 9c illustrates a connector arrangement for a further peripheral device.

In some embodiments, a set of resistors may be provided in the accessory controlled by push buttons or similar in order to transmit user commands, for volume increase or decrease, from the accessory to the host device. These resistors may be placed in parallel with a microphone if present, or in place of a microphone, for instance between pins A8 and B8 as illustrated in FIG. 9c. The polarity of the connection of these resistors is not important. Thus in embodiments with no microphone the characteristic impedance may be omitted.

The discovery method referred to above determined to which pin the characteristic impedance Rch was connected. By applying or monitoring currents and voltages to the non-ground pin to which Rch is connected it is also possible to measure its value. The value of this resistor may be arranged to distinguish between different possible models or types of accessory. For example, a plurality of non-overlapping bands of resistance values may be defined, with each band of resistance values corresponding to a different model or type of accessory. By determining in which band the characteristic impedance value falls, the model or type of accessory may be determined.

Figure 10:
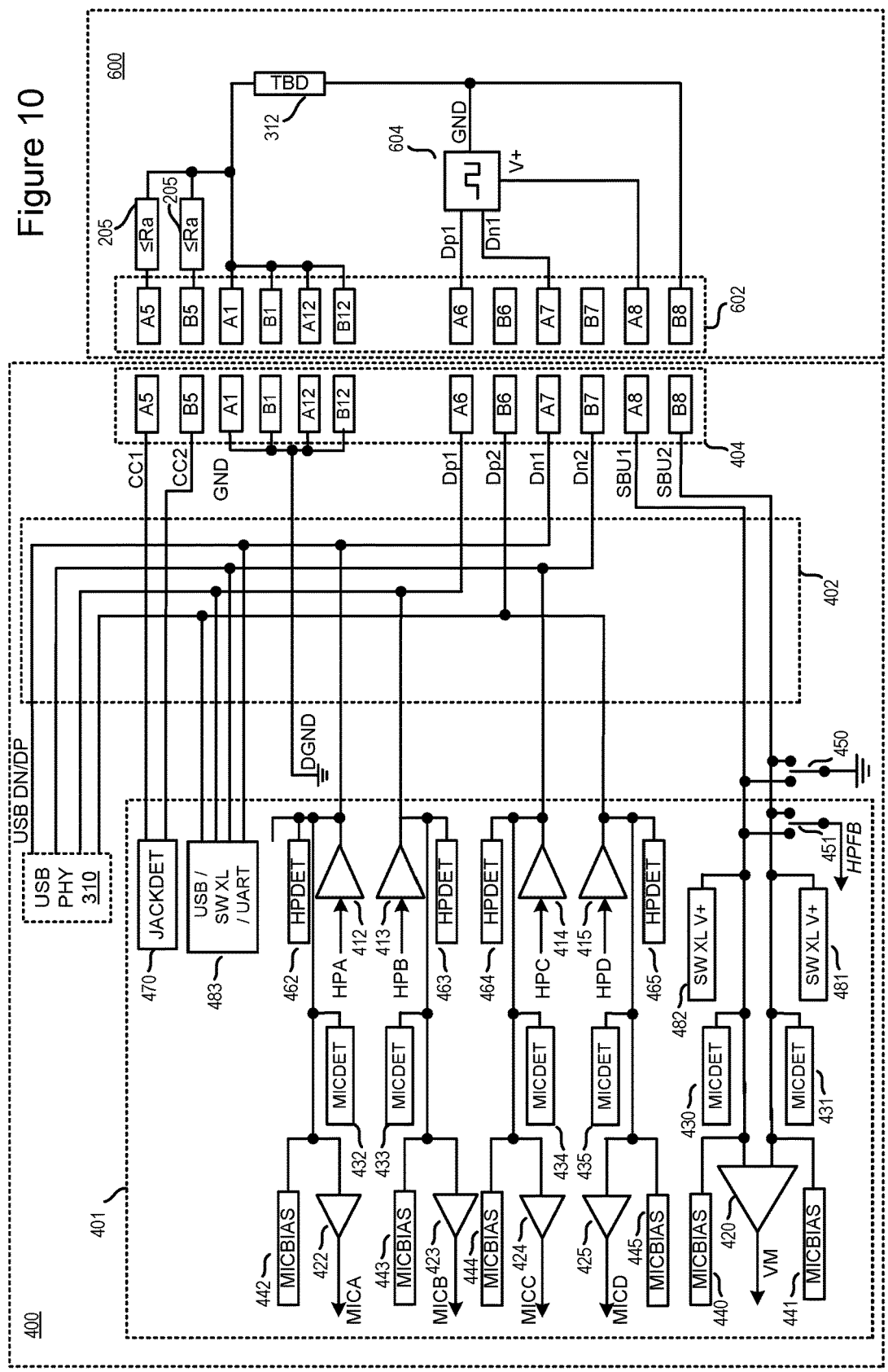
FIG. 10 illustrates a peripheral device and host device with connector arrangements according to a further embodiment.

FIG. 10 illustrates the connection of a different accessory or peripheral device 600 to the host device 400. In this embodiment the peripheral device 600 is a digital processing device such as an electronic sensor (e.g. a light sensor, a fingerprint sensor, etc), a health monitor or any other type of peripheral device, and comprises a processor 604. The processor 604 is coupled to both pins A6 and A7, as well as A8 and B8. The processor may comprise programmable circuitry for processing the sensor signals. The processor may additionally or alternatively comprise processing circuitry whose function is fixed in design.

In the host device 400, the USB data controller 310 may be activated to drive or monitor pins A6 and A7 of the connector 404. Other components in the codec 401 coupled to pins A6 and A7 may be deactivated to prevent their interfering with data signals from the controller 310. Pins A9 and B9 of the connector (not illustrated) may be used to provide power to the processor or USB interface therein as allowed by the USB Type C standard referred to above. Alternatively pins A8 or B8 of the connector 404 may be coupled to a disableable supply connection 481 or 482 and the other one of A8 or B8 connected to analogue ground via ground switch 450 in order to provide some or all power and a ground to the processor 604.

In further embodiments, codec 401 may comprise a further digital interface 483 which may provide a uni-directional or bi-directional digital interface via accessory pins A6 and A7 (which may be either pins A6 and A7 in one orientation of the accessory or B6 and B7 in the other orientation of the connectors) to processor 604. This digital interface may be of various formats, for example Soundwire XL or be a universal asynchronous receiver/transmitter (UART). Pins A8 or B8 of the connector 404 may be coupled to a disableable supply connection 481 or 482 and the other one of A8 or B8 connected to analogue ground via ground switch 450 in order to provide some or all power and a ground to the processor 604 compatible with the voltages on the digital interface 483.

This digital interface 483 may provide a path to or from the accessory to the applications processor or direct to a wireless modem with lower latency than a separate USB controller, particularly if (for example) the USB controller is integrated on an applications processor and its data is required to be relayed though the applications processor. In some embodiments this interface may be a USB interface, in addition or instead of USB PHY 310.

Thus, in such an example, an electronic device would comprise an application processor, a wireless modem, a connector (such as the USB type-C connector, another rotationally symmetric connector or any other connector) for connecting the electronic device to an accessory device, an audio codec providing audio signals to the connector and/or receiving audio signals from the connector, and a first digital interface, configurable to provide a first signal path for signals between the application processor and the connector. The first digital interface may be a USB interface, for example, such as a USB PHY. The first digital interface may be integrated on the application processor, or provided on a separate integrated circuit, such as a power management or power delivery integrated circuit or a dedicated digital interface integrated circuit. The wireless modem may also be integrated on the application processor.

The audio codec is coupled to the application processor, the wireless modem and the connector, and comprises a second digital interface which is configurable to provide a second signal path via the audio codec for signals between the wireless modem and the connector. The second signal path may have a lower latency than the first signal path. The second signal path may be suitable for use, for example, when the wireless modem receives wireless communications signals comprising an audio component (such as a voice, e.g. if the electronic device is making a voice call via a mobile communications network).

The second signal may additionally pass via the application processor. However, in that case it may not utilize any audio-processing software that is implemented in the application processor so as to achieve lower latency.

The first digital interface and the second digital interface may be connected to at least one common contact (and possibly a plurality of common contacts) on the connector.

The device 600 additionally comprises characteristic impedances 205 on the A5 and B5 pins. The characteristic impedances 205 are each less than 1.2 kohms (i.e. less than Ra), such that their detection leads to the interface entering the Audio Accessory Adapter Mode.

According to embodiments, the device 600 further comprises a characteristic impedance Rch 312 coupled between each of the power contacts A1, B1, A12 and B12 (which are tied together) and the reference voltage pin B8. This further characteristic impedance may be used to discover the relative orientation of the connectors in a similar fashion to that described above, and the value of the impedance in a particular accessory used to distinguish the type of accessory according to which of a predetermined set of resistance bands the measured impedance lies.

Figure 11:
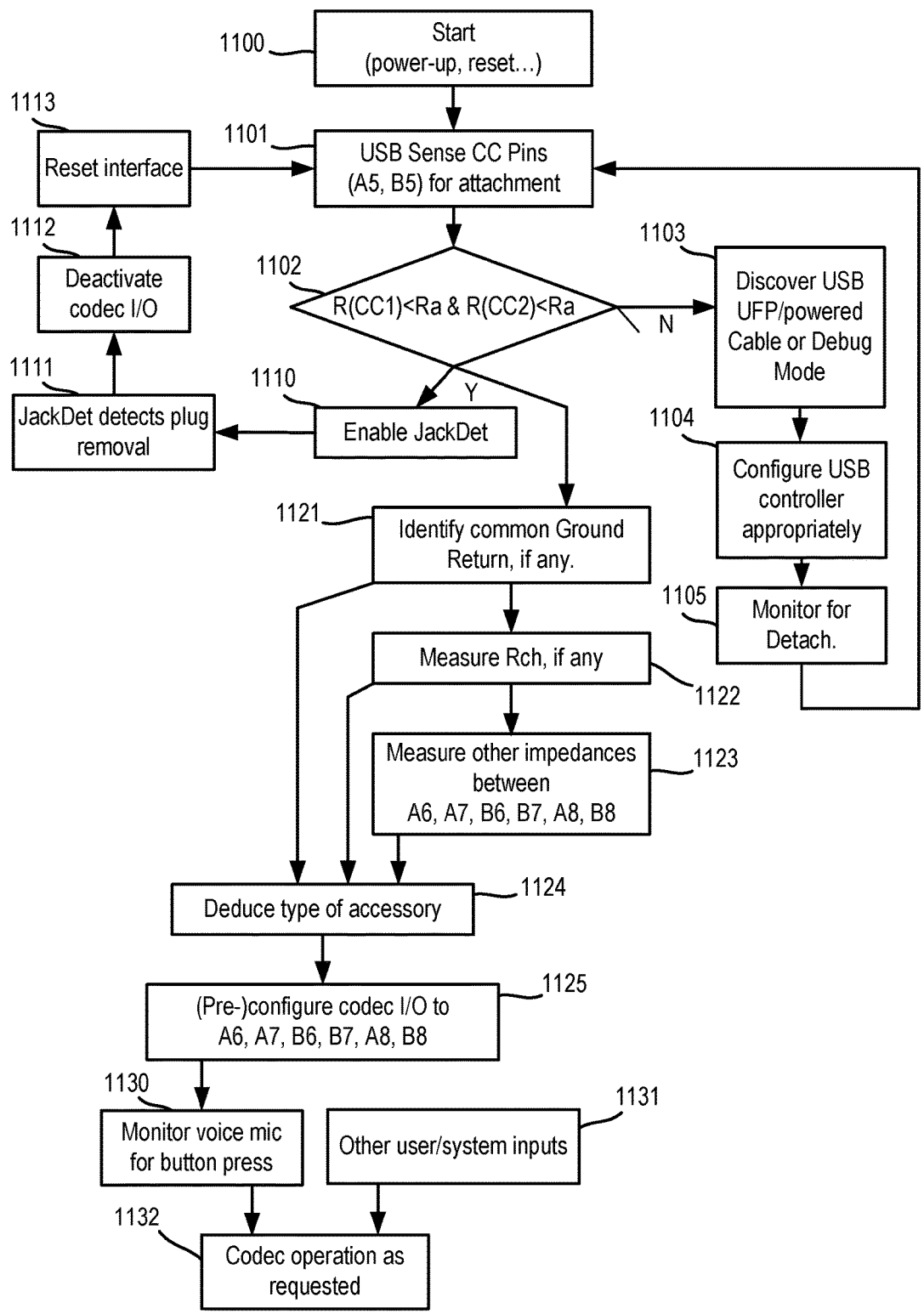
FIG. 11 illustrates a flowchart of a method of device discovery and configuration according to an embodiment.

Some embodiments of host device 400 may allow operation of interface 483, for example a USB interface 483, in conjunction with accessory devices that do not operate in Audio Accessory mode, and thus do not have characteristic impedances 205 less than Ra on both A5 and B5 pins, for instance pure USB headsets that do not have analog signal capability. The interface 483 may be selected by instructions received from the application processor or may be selected by the codec recognizing that it is being asked to communicate audio data with a digital-only accessory FIG. 11 illustrates a method of discovery and configuration that may be employed by the host device according to an embodiment of the invention.

The method starts in step 1100. For example, the method may begin with some event such as a power-on or start-up of the host device, a user-induced or autonomous exit from a dormant or sleep mode due to a physical stimulus or the arrival of an external phone call. Many alternatives are possible.

By default, the USB system may have control of the USB-C interface. At step 1101 the USB controller may thus be configured by the processor in overall control of the host device to monitor the CC pins (A5 and B5) to monitor for attachment of a plug, for instance by monitoring the voltage. As a downstream facing port, the USB controller may look for characteristic impedances Rd or Ra being connected to the CC pins (where Rd and Ra are defined in the USB type-C specification and Rd>Ra). If or when it is determined that a connection is present, the combination of impedances present at the CC pins may be used to determine the type of connection and the orientation. Thus for example an impedance Rd connected to one CC pin with the other being open defines that an upstream facing port (UFP) is attached and provides the orientation by virtue of which CC pin is connected to Rd. An impedance Rd at one pin and Ra at the other implies a powered cable with a UFP attached whereas an impedance of Ra at one pin with the other being open implies a powered cable without a UFP. An impedance of Rd at both pins allows operation in a debug mode.

As described above, however, if both pins A5 and B5 are connected to digital ground by an impedance less than a value Ra (wherein Ra equals 1.2 kohm) then an "Audio Accessory Adapter Mode" may be initiated. Thus at step 1102 it may be determined whether or not both CC pins have impedances lower than a specific or threshold value i.e. Ra.

If not, i.e. if at least one of the CC pins is connected to an impedance greater than Ra or is open-circuit, then the values of both impedances relative to Ra and Rd are detected and analysed in step 1103, and the system enters an appropriate mode in step 1104, e.g. for a powered cable, UFP attached or debug mode. It will be appreciated therefore that the host device may operate in a USB mode for digital data transfer via the Type-C receptacle if an appropriate peripheral or hub is connected. In the USB mode the USB physical controller 310 may activate its outputs to establish a pair of signal paths to either pins A6 and A7 or pins B6 and B7 on the receptacle or other host device connector to provide a differential digital data path to the accessory. In step 1105, the USB controller continues to monitor for detachment of the plug, in which event it may disable the USB physical interface and return to step 1101 to monitor for any subsequent re-attachment.

If, however, in step 1102 both impedances attached to the CC pins are determined to be lower than a specific or threshold value i.e. Ra, then the host device may enter the Audio Accessory Adapter mode. This repurposes at least some of the four central pins A6, A7, B6, and B7 to carry analogue signals, e.g. to and/or from an audio codec 401. In the Audio Accessory Adapter mode of operation an audio path controller, which may at least partly be implemented by the audio codec 401, may enable suitable signal paths to or from these pins.

Note that the USB supervisory system, when it has detected the attachment or removal of the USB plug, may signal the attachment or especially the removal of the USB plug to the audio codec 401. (Additionally or alternatively where the USB plug is connected to an adapter that itself contains a socket, the detection may rely on the insertion of a suitable jack plug into the adapter socket and thus the USB supervisory circuitry could signal attachment or removal of the jack plug from the adapter socket.)

However, rather than the USB supervisory system detecting the removal of a plug, for better suppression of audible pops and clicks on detach it may be better for the codec to sense this directly. This avoids any processing delays involved in the sense circuitry in the USB chip sensing the disconnection and communicating it to the codec, e.g. via some suitable GPIO (general purpose input-output) pin say. It will be appreciated that many existing codecs already comprise a jack detection module JACKDET to sense the presence of a 3.5 mm jack using a mechanically switched contact to ground. As illustrated in FIGS. 3, 5 and 10 therefore the codec 401 may comprise a jack detection module JACKDET 470 connected to the CC pins A5 and/or B5 of the receptacle 404. On detection of connection of an analogue audio peripheral 300, 500, 600 the USB physical controller 310 may activate this module in step 1110 (note that as used herein the term jack detect shall include detection of insertion and/or removal of the USB type-C plug from the receptacle).

The jack detect module may continue to monitor for the presence of an impedance from the CC pins to ground, and if this impedance disappears, e.g. due to removal of the USB plug, then any other active codec outputs may be deactivated in step 1112, and other actions necessary to reset the interface, for example advising the USB controller and/or any overall host device controller undertaken in step 1113. The USB controller may be configured to operate as in step 1101 to monitor for any re-attachment.

Once it has been identified that an analogue peripheral device is connected in step 1102, discovery controller circuitry in the audio codec 401 may perform further testing to determine a connection configuration for the attached peripheral device. As described above this may involve determining the type of load, if any, to which at least some of the contacts of the receptacle are connected. There may be a limited set of possible connection configurations based on allowed device configurations and the two possible mating orientations of the plug in the receptacle. The method may involve a discovery module determining the type of load for a certain number of contacts until a connection configuration can be correctly identified.

In step 1121 a discovery module may determine whether either of receptacle pins A8 and B8 is connected to a common ground return of the accessory, and if so which of these two pins is connected to this ground return and which may be connected to another component such as a voice microphone or push-button resistor bank.

In step 1122, which may occur after, before or in parallel with step 1121, the discovery module may attempt to determine whether a characteristic impedance Rch is connected between pins A8 or B8 of the host device connector and the digital ground return connection of the accessory. The polarity of the relative orientation of the host and accessory connectors may be deduced according to whether this impedance is connected to pins A8 or B8 of the host connector, based on a predefined convention for instance that this impedance is connected to pin A8 of the accessory connector.

The discovery controller may also determine the value of the connected impedance and may hence determine a type or model of accessory according to some predefined mapping of accessory versus impedance value ranges.

The characteristic impedances Rch, 312, for a particular device may each take a particular value that is associated, for example in a look-up table, with that particular type of peripheral device (and a particular set of signal paths between the codec 401 and the connector 404).

For example, a first value for the characteristic impedance Rch (e.g. 10 kohms), or a range of impedance values centred on the first value, may be associated with a conventional set of headphones having left and right speakers and a voice microphone; a second value (e.g. 20 kohms) for the characteristic impedance Rch may be associated with a set of headphones having left and right speakers, a voice microphone, and one or more noise-cancellation microphones; a third value (e.g. 30 kohms) for the characteristic impedance Rch may be associated with a set of balanced headphones having left and right speakers (each driven by two outputs) and a voice microphone; further values of the impedance may be associated with different types of device comprising a processor and possibly requiring different connections to the codec 401.

Thus the discovery module is able to determine the type of peripheral device that is connected to the host device 400 by measuring the value of the characteristic impedance Rch. The discovery module may consult a look-up table (which may be located in memory stored on the codec 401, or in some other memory provided in the device 400) to determine the type of device, or more particularly the necessary configuration of the components of the codec 401, that is associated with the measured value of impedance. This information, together with the known orientation of the receptacle connector 404 relative to the plug connector 302, 502, 602, allows the codec to be configured to drive or monitor appropriate pins of the receptacle connector 404.

Assuming the accessory that has been attached is of an anticipated type or configuration, the discovery controller will now have determined via steps 1121 and/or 1122 which relative orientation the receptacle or host device connector 404 is located with respect to the plug or accessory connector 302, 502, 602 or suchlike.

In step 1123, the discovery module may proceed to make any further measurements of impedances between various host device connector pins necessary for the discovery controller to determine in step 1124 which of any other possible variations of connection arrangements the accessory comprises.

Thus in step 1125 the signal paths to the A6, A7, B7 and B8 pins are configured based on the known orientation of the connector 404 and the known type of peripheral device 300, 500, 600. For instance, the one of the pins A8 and B8 that has been determined to be connected (504) to the common ground return from the accessory, may be connected to the analogue ground of the host device. The microphone bias coupled to the other of pins A8 and B8 of the host device may be activated to provide bias for a voice microphone determined to be connected to this other pin.

Note that some components may not be fully activated immediately, but merely placed into a state in which they may be later activated. For instance the headphone driver amplifiers may in some cases not be powered up, or their output may be pulled to ground, until there is a signal requiring to be driven through the speakers.

As mentioned above, once an attached headset is activated, the user may in some embodiments be able to intimate his commands by altering the impedance across the microphone pins by push-button switches or the like. Thus in step 1130 the resistance apparent across these pins is monitored, and any resistance changes interpreted. Also other configurations of the codec may be requested by the user or the system in step 1131. The user may request various codec functionality via other inputs such as keyboards or touch-screen inputs, or even speech-recognised vice inputs. Also other configurations of the codec may be requested by the system due to other system stimuli such as incoming voice telephone calls. All these inputs may be received, arbitrated if necessary, and then responded to in step 1132 by suitably configuring signal paths in the codec.

It should be appreciated that the connections described above are by way of example only and that other possible connections between the audio components of a peripheral or accessory device and the pins of a type-C connector may be possible. In general however pins A5 and B5 should be reserved as CC pins and preferably any analogue data may be transmitted via contacts A6-A8 and/or B6-B8 and especially via contacts A6, A7, B6 and B7.

Note that, according to embodiments of the invention, the step of enabling signal paths between the pins and components of the codec 401 may comprise physically switching the paths between components as required, rather than activating and deactivating components within the codec 401.

Also it should be appreciated that FIG. 3 illustrates embodiments with outgoing analogue connections from the host device to stereo loudspeakers and incoming analogue signals to the host device from multiple microphones, at least some of which may be for noise cancellation. It will be appreciated however that other combinations of microphones and/or loudspeakers may be enabled, for instance the peripheral could be a headset without a voice microphone but with left and right noise cancellation microphones. It will further be appreciated that the idea is also applicable to other combinations of analogue sources and sinks, and to signals flowing in either direction.

For example the peripheral device could be a speaker phone accessory with, say 5 microphones with analogue connections with the microphones enabled via plug pins A6, A7, A8, B6, and B7 with a ground return on B8.

In some embodiments the peripheral device may include at least some circuitry which is powered in use by a voltage provided on a voltage bus pin of the type-C connector. The type-C specification identifies pins A9 and B9 for use for supplying a voltage bus, $V_{BUS}$ for power delivery. In some embodiments therefore the host device may provide appropriate power on this $V_{BUS}$ connection to power a chip in the peripheral device.

As mentioned above embodiments of the present invention thus provide methods and apparatus for connecting a peripheral device to a host device via a general or multi-purpose connector such as a USB Type-C connector. Embodiments allow analogue data channels to be established such that audio components of the peripheral device may be operated with analogue driving/reading signal paths between the host and the peripheral and provide for more data channels than conventional approaches.

Embodiments allow for use of audio accessory device having at least four independent audio input or output signal paths via separate contacts of a first connector, which may comprise pins arranged in a rotationally symmetric configuration, for example a connector compatible with a USB Type-C connector. At least a plurality of the signal paths may be for transfer of analogue audio signals.

As mentioned one particular application is for enabling analogue data channels for at least stereo loudspeakers in a balanced configuration. Applications may also enable a channel for reading data from a voice microphone.

Figure 12:
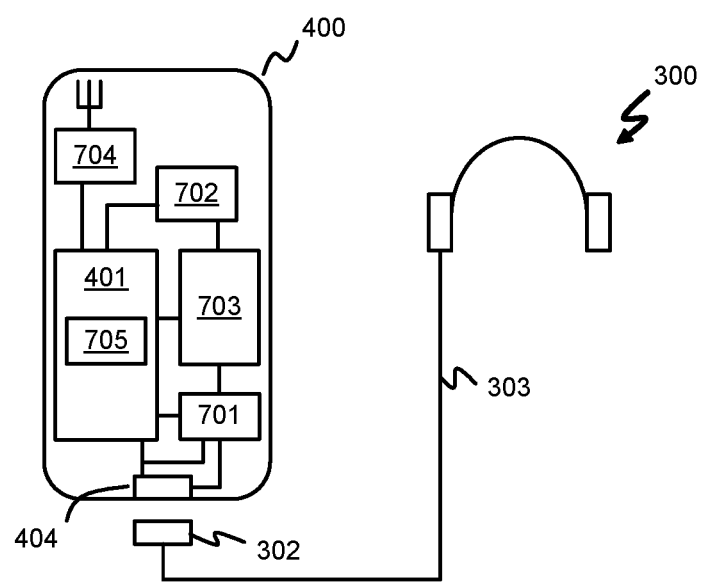
FIG. 12 illustrates one example of a host device.

FIG. 12 illustrates a host device 400, which may for example be a mobile telephone or a mobile computing device such as a laptop or tablet computer. The mobile device may have a connector for connecting to peripheral or accessory devices and which may be a USB type-C receptacle 404. In use the host device may be connected to an accessory 300 by connecting a type-C plug 302 of the accessory to the receptacle 404 of the host device. The plug 302 may be connected to the rest of the accessory 300 via a connection 303 which may comprise a captive cable.

The type-C receptacle may be coupled to a USB interface circuit 701 which may include high speed USB 3.1 interfaces to other pins for example comprising A2, A3, A4 or A9, A10, A11 of the USB Type-C connector. Other pins of the receptacle may be coupled to both the USB interface circuit 701 and an audio codec 401, for example pins A6, A7, A8.

The host device includes data controller circuitry to control discovery and to configure signal paths from receptacle 404 to signal sources or sinks which may reside in a wireless communications interface 704 or an area of local storage or memory 702 or the applications processor 703. As discussed with respect to FIG. 4, the data controller may be regarded as comprising a discovery controller and a path controller. This discovery controller and a path controller circuitry may each be incorporated in part or in whole in one or more of the USB interface 701, audio codec 401 or applications processor 703. For instance circuitry to detect standard USB operation may be incorporated in the USB interface circuitry 701, but once Audio Adapter Accessory Mode is detected control may be substantially handed over to control circuitry within the audio codec 401.

The data controller circuitry may be specially designed or hard-wired to perform appropriate functions, or may at least partially comprise general purpose programmable circuitry that may operate according to code or instructions stored in a part of local memory 702 which may comprise non-volatile memory elements.

The audio codec 401 may transmit analogue audio data to accessory 300 for playback via loudspeakers of the accessory 300. The audio data may include audio data from a media file stored in memory 702 which may be received directly from the memory or via an applications processor 703. In some instances the audio data may be generated by the applications processor 703 or by the audio codec under instruction from the applications processor 703. The audio data could be audio data received via a communications interface such as an antenna 704 for wireless communication.

In addition the audio codec 401 may receive audio data from the accessory 300. This may for instance be analogue voice data from a voice microphone to be transmitted via antenna 704, stored in a media file in memory 702 or processed for controlling the applications processor 703. The audio codec 401 may also audio data from noise cancellation microphones of the accessory 300. This data may also be transferred via an analogue data path. A noise cancellation module 705 of the codec 401 may determine appropriate noise cancellation signals and modulate the outgoing analogue loudspeaker data accordingly.

The skilled person will thus recognise that some aspects of the above-described apparatus and methods, for example the discovery and configuration methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like.

A module may itself comprise other modules or functional units. A module may be provided by multiple components or sub-modules which need not be co-located and could be provided on different integrated circuits and/or running on different processors. For example the microphone bias, microphone detect and headphone detect blocks referred to above may share components.

Embodiments may be implemented in a host device, especially a portable and/or battery powered host device such as a mobile telephone, an audio player, a video player, a PDA, a mobile computing platform such as a laptop computer or tablet and/or a games device for example. Embodiments of the invention may also be implemented wholly or partially in accessories attachable to a host device, for example in active speakers or headsets or the like. Especially in more complex devices, there may be more than one USB Type-C or similar connector and associated signal paths and control per aspects of the invention.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope. Terms such as amplify or gain include possibly applying a scaling factor of less than unity to a signal.

The invention claimed is:

1. An electronic device, comprising:
   an application processor;
   a wireless modem;
   a connector, for connecting the electronic device to an accessory device;
   an audio codec, coupled to the application processor, the wireless modem and the connector, for at least one of providing audio signals to the connector and receiving audio signals from the connector; and
   a first digital interface, configurable to provide a first signal path for signals between the application processor and the connector,
   wherein the audio codec comprises a second digital interface configurable to provide a second signal path via the audio codec for signals between the wireless modem and the connector;
   wherein the first signal path does not pass via the second digital interface; and
   wherein the second signal path does not pass via the first digital interface.

2. The electronic device according to claim 1, wherein the second digital interface is a USB interface.

3. The electronic device according to claim 1, wherein the connector is a USB connector.

4. The electronic device according to claim 3, wherein the connector is a USB type-C connector.

5. The electronic device according to claim 1, wherein the wireless modem is configured to receive wireless communication signals comprising an audio component.

6. The electronic device according to claim 5, wherein the second digital interface is configured to provide the second signal path for the audio component of the wireless communication signals.

7. The electronic device according to claim 1, wherein the second signal path additionally passes via the application processor.

8. The electronic device according to claim 1, wherein at least one of the wireless modem and the first digital interface is integrated on the application processor.

9. The electronic device according to claim 1, wherein the first digital interface and the second digital interface are connected to at least one common contact on said connector.

10. The electronic device according to claim 1, wherein the electronic device is at least one of: a portable device; a battery powered device; a communications device; a computing device; a mobile telephone; a laptop, notebook or tablet computer; a personal media player; a gaming device; and a wearable device.

11. An electronic device, comprising:
an application processor;
a wireless modem;
a connector, for connecting the electronic device to an accessory device;
an audio codec, coupled to the application processor, the wireless modem and the connector, for at least one of providing audio signals to the connector and receiving audio signals from the connector; and
a first digital interface, configurable to provide a first signal path for signals between the application processor and the connector;
wherein the audio codec comprises a second digital interface configurable to provide a second signal path via the audio codec for signals between the wireless modem and the connector; and
wherein the first digital interface and the second digital interface are directly connected to at least one common contact on said connector.

* * * * *

UNITED STATES PATENT AND TRADEMARK OFFICE
CERTIFICATE OF CORRECTION

PATENT NO.         : 10,187,727 B2
APPLICATION NO.    : 15/659276
DATED              : January 22, 2019
INVENTOR(S)        : Robert David Rand and John Laurence Pennock It is certified that error appears in the above-identified patent and that said Letters Patent is hereby corrected as shown below:

In the Specification

1. In Column 13, Line 27, delete "(Ra)" and insert -- ($\leq$Ra) --, therefor.

Signed and Sealed this
Twenty-second Day of October, 2019

Andrei Iancu
*Director of the United States Patent and Trademark Office*